US010728828B2

(12) United States Patent
Wei

(10) Patent No.: US 10,728,828 B2
(45) Date of Patent: Jul. 28, 2020

(54) IP ADDRESS MANAGEMENT METHOD AND APPARATUS, IP ADDRESS ANCHOR, AND MOBILE NODE

(71) Applicant: HUAWEI TECHNOLOGIES CO., LTD., Shenzhen, Guangdong (CN)

(72) Inventor: Xinpeng Wei, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 126 days.

(21) Appl. No.: 15/870,171

(22) Filed: Jan. 12, 2018

(65) Prior Publication Data
US 2018/0139685 A1 May 17, 2018

Related U.S. Application Data

(63) Continuation of application No. PCT/CN2015/084149, filed on Jul. 15, 2015.

(51) Int. Cl.
*H04W 40/36* (2009.01)
*H04W 8/08* (2009.01)
*H04L 29/12* (2006.01)

(52) U.S. Cl.
CPC ........... *H04W 40/36* (2013.01); *H04W 8/087* (2013.01); *H04L 61/6068* (2013.01)

(58) Field of Classification Search
CPC .... H04W 40/36; H04W 8/087; H04L 61/6068
See application file for complete search history.

(56) References Cited

U.S. PATENT DOCUMENTS

| 2006/0020787 | A1 | 1/2006 | Choyi et al. |
| 2006/0187926 | A1 | 8/2006 | Imai et al. |
| 2006/0291425 | A1* | 12/2006 | Park ................. H04W 36/0011 370/331 |
| 2008/0307487 | A1 | 12/2008 | Choyi et al. |

(Continued)

FOREIGN PATENT DOCUMENTS

| CN | 101213790 A | 7/2008 |
| CN | 101765092 A | 6/2010 |

(Continued)

OTHER PUBLICATIONS

International Search Report dated Mar. 24, 2016 in corresponding International Patent Application No. PCT/CN2015/084149.

(Continued)

*Primary Examiner* — Ricky Q Ngo
*Assistant Examiner* — Stephen N Steiner
(74) *Attorney, Agent, or Firm* — Womble Bond Dickinson (US) LLP

(57) ABSTRACT

Embodiments of the present invention relate to the field of communications technologies, and provide an IP address management method and apparatus, an IP address anchor, and a mobile node. The method includes: when detecting that a mobile node (MN) accesses an IP subnet on which an IP address anchor is located, obtaining, by the IP address anchor, a valid IP address prefix being used by the MN; and sending, by the IP address anchor, switchover indication information to the MN according to the valid IP address prefix, so that the MN determines, according to the switchover indication information, whether the accessed IP subnet has changed. The present invention resolves a prior-art problem that an MN cannot determine whether an IP subnet accessed by the MN has changed, thereby achieving a technical effect that an MN can accurately determine whether an IP subnet accessed by the MN has changed.

16 Claims, 10 Drawing Sheets

(56) References Cited

U.S. PATENT DOCUMENTS

| | | | |
|---|---|---|---|
| 2011/0051659 A1 | 3/2011 | Oulai | |
| 2014/0321328 A1* | 10/2014 | Zuniga | H04W 8/06 370/254 |

FOREIGN PATENT DOCUMENTS

| | | | |
|---|---|---|---|
| CN | 102625987 A | 8/2012 | |
| CN | 103974226 A | 8/2014 | |
| EP | 1747648 61 | 5/2012 | |
| JP | 2007536872 A | 12/2007 | |
| WO | 2015/009735 A1 | 1/2015 | |

OTHER PUBLICATIONS

Extended European Search Report dated May 24, 2018, in corresponding European Patent Application No. 15898016.9, 8 pgs.

Santesson, et al., "TLS User Mapping Extension," Network Working Group, Request for Comments: 4681, Oct. 2006, 11 pgs.

Thomson, et al., "IPv6 Stateless Address Autoconfiguration," Network Working Group, Request for Comments: 4862, Sep. 2007, 32 pgs.

Perkins, et al., "Mobility Support in IPv6," Internet Engineering Task Force (IETF), Request for Comments: 6275, Jul. 2011, 169 pgs.

International Search Report dated Mar. 24, 2016, in corresponding International Patent Application No. PCT/CN2015/084149, 7 pgs.

Written Opinion of the International Searching Authority dated Mar. 24, 2016, in corresponding International Patent Application No. PCT/CN2015/084149, 5 pgs.

Office Action, dated Dec. 11, 2018, in Japanese Application No. 2018501168 (6 pp.).

\* cited by examiner

IP ADDRESS MANAGEMENT METHOD AND APPARATUS, IP ADDRESS ANCHOR, AND MOBILE NODE

CROSS-REFERENCE TO RELATED APPLICATIONS

This application is a continuation of International Patent Application No. PCT/CN2015/084149 filed on Jul. 15, 2015. The disclosure of the aforementioned application is hereby incorporated by reference in the entity.

TECHNICAL FIELD

The present disclosure relates to the field of communications technologies, and in particular, to an IP address management method and apparatus, an IP address anchor, and a mobile node.

BACKGROUND

A mobile node (MN for short) is a mobile terminal device such as a mobile phone, a tablet computer, or a portable computer. Because of mobility of the MN, the MN moves among multiple Internet Protocol (IP for short) subnets. To ensure that the MN can still communicate with a correspondent node (CN for short) after the MN moves among the IP subnets, a mobility management solution emerges accordingly.

At present, a distributed mobility management solution is relatively widely applied. A distributed mobility management (DMM for short) network architecture includes multiple IP subnets. An IP address anchor is correspondingly deployed for each IP subnet. On a DMM network, an existing IP address management method is as follows: When an MN moves from a first IP subnet to a second IP subnet, an IP address anchor on the second IP subnet allocates an IP address prefix to the MN. Then, the IP address anchor provides the MN with the IP address prefix allocated by the IP address anchor and a valid IP address prefix being used by the MN, so that by using the IP address prefix, the MN continues with an existing network session or initiates a new network session.

In a process of implementing the present invention, the inventor finds that the prior art has at least the following disadvantage: Because one IP address anchor may allocate different IP address prefixes, an MN cannot accurately determine, according to a change status of a received IP address prefix, whether an IP subnet accessed by the MN has changed.

SUMMARY

To resolve a prior-art problem that an MN cannot determine whether an IP subnet accessed by the MN has changed, embodiments of the present invention provide an IP address management method and apparatus, an IP address anchor, and a mobile node. The technical solutions are as follows.

According to a first aspect, an IP address management method is provided, where the method includes:

when detecting that a mobile node MN accesses an IP subnet on which an IP address anchor is located, obtaining, by the IP address anchor, a valid IP address prefix being used by the MN; and sending, by the IP address anchor, switchover indication information to the MN according to the valid IP address prefix, so that the MN determines, according to the switchover indication information, whether the accessed IP subnet has changed.

In a first possible implementation of the first aspect, the sending, by the IP address anchor, switchover indication information to the MN according to the valid IP address prefix includes:

determining, by the IP address anchor, whether the valid IP address prefix already includes an IP address prefix allocated by the IP address anchor;

if the valid IP address prefix does not include an IP address prefix allocated by the IP address anchor, allocating, by the IP address anchor, an IP address prefix to the MN, and differentially identifying the IP address prefix allocated by the IP address anchor and an IP address prefix that is in the valid IP address prefix and that is allocated by another IP address anchor; or if the valid IP address prefix already includes an IP address prefix allocated by the IP address anchor, differentially identifying, by the IP address anchor, the IP address prefix allocated by the IP address anchor and an IP address prefix that is in the valid IP address prefix and that is allocated by another IP address anchor; and sending, by the IP address anchor, the switchover indication information to the MN, where the switchover indication information includes the IP address prefix allocated by the IP address anchor, the IP address prefix allocated by the another IP address anchor, and a type identifier, where the type identifier is used to differentially identify the IP address prefix allocated by the IP address anchor and the IP address prefix allocated by the another IP address anchor.

With reference to the first aspect, in a second possible implementation of the first aspect, the sending, by the IP address anchor, switchover indication information to the MN according to the valid IP address prefix includes:

determining, by the IP address anchor according to the valid IP address prefix, whether the IP subnet accessed by the MN has changed; and sending, by the IP address anchor, the switchover indication information to the MN according to a determining result, where the switchover indication information includes a first indicator or a second indicator, where the first indicator is used to indicate that the IP subnet accessed by the MN has changed, and the second indicator is used to indicate that the IP subnet accessed by the MN has not changed.

With reference to the second possible implementation of the first aspect, in a third possible implementation of the first aspect, the determining, by the IP address anchor according to the valid IP address prefix, whether the IP subnet accessed by the MN has changed includes:

determining, by the IP address anchor, whether the valid IP address prefix already includes an IP address prefix allocated by the IP address anchor;

if the valid IP address prefix does not include an IP address prefix allocated by the IP address anchor, determining, by the IP address anchor, that the IP subnet accessed by the MN has changed; or if the valid IP address prefix already includes an IP address prefix allocated by the IP address anchor, determining, by the IP address anchor, whether the IP address prefix allocated by the IP address anchor has a corresponding preset identifier, where the preset identifier is corresponding to an IP address prefix allocated to the MN by an IP subnet that is accessed by the MN before the MN accesses the IP subnet on which the IP address anchor is located; and if the IP address prefix allocated by the IP address anchor has the corresponding preset identifier, determining, by the IP address anchor, that the IP subnet accessed by the MN has not changed; or if the IP address prefix allocated by the IP address anchor does not have the corresponding preset identifier, determining, by the IP address anchor, that the IP subnet accessed by the MN has changed.

With reference to the third possible implementation of the first aspect, in a fourth possible implementation of the first aspect, the method further includes:

if the valid IP address prefix does not include an IP address prefix allocated by the IP address anchor, allocating, by the IP address anchor, an IP address prefix to the MN, and differentially identifying the IP address prefix allocated by the IP address anchor and an IP address prefix that is in the valid IP address prefix and that is allocated by another IP address anchor; or if the valid IP address prefix already includes an IP address prefix allocated by the IP address anchor, differentially identifying, by the IP address anchor, the IP address prefix allocated by the IP address anchor and an IP address prefix that is in the valid IP address prefix and that is allocated by another IP address anchor; and sending, by the IP address anchor, a router advertisement message to the MN, where the router advertisement message includes the IP address prefix allocated by the IP address anchor, the IP address prefix allocated by the another IP address anchor, and a type identifier, where the type identifier is used to differentially identify the IP address prefix allocated by the IP address anchor and the IP address prefix allocated by the another IP address anchor.

With reference to the first or the fourth possible implementation of the first aspect, in a fifth possible implementation of the first aspect, the differentially identifying, by the IP address anchor, the IP address prefix allocated by the IP address anchor and an IP address prefix that is in the valid IP address prefix and that is allocated by another IP address anchor includes:

correspondingly setting, by the IP address anchor, a first type identifier for the IP address prefix allocated by the IP address anchor; and/or correspondingly setting, by the IP address anchor, a second type identifier for the IP address prefix allocated by the another IP address anchor.

With reference to the first or the third possible implementation of the first aspect, in a sixth possible implementation of the first aspect, the determining, by the IP address anchor, whether the valid IP address prefix already includes an IP address prefix allocated by the IP address anchor includes:

determining, by the IP address anchor, whether a network identifier corresponding to each valid IP address prefix includes a network identifier corresponding to the IP address anchor, where the network identifier is an anchor identifier or a network code; and if the network identifier corresponding to the IP address anchor exists, determining, by the IP address anchor, that the valid IP address prefix already includes an IP address prefix allocated by the IP address anchor; or if the network identifier corresponding to the IP address anchor does not exist, determining, by the IP address anchor, that the valid IP address prefix does not include an IP address prefix allocated by the IP address anchor.

With reference to the sixth possible implementation of the first aspect, in a seventh possible implementation of the first aspect, the obtaining, by the IP address anchor, a valid IP address prefix being used by the MN includes:

sending, by the IP address anchor to a location manager LM, an information obtaining request that carries a node identifier of the MN, so that the LM searches for and obtains, from a prestored entry according to the node identifier of the MN, the valid IP address prefix being used by the MN and the network identifier corresponding to each valid IP address prefix, where each entry includes a correspondence among a node identifier, a network identifier, an IP address prefix, and a validity period of the IP address prefix, and the IP address prefix allocated to the MN by the IP subnet that is accessed by the MN before the MN accesses the IP subnet on which the IP address anchor is located further has the corresponding preset identifier; and receiving, by the IP address anchor, the valid IP address prefix and the network identifier corresponding to each valid IP address prefix, where the valid IP address prefix and the network identifier are fed back by the LM.

With reference to the seventh possible implementation of the first aspect, in an eighth possible implementation of the first aspect, the method further includes:

sending, by the IP address anchor, an information storage request to the LM, where the information storage request carries the node identifier of the MN, the network identifier corresponding to the IP address anchor, the IP address prefix allocated by the IP address anchor, and a validity period of the IP address prefix allocated by the IP address anchor, so that the LM stores a target entry according to the information storage request, correspondingly sets the preset identifier in the target entry, and removes the preset identifier from an entry that records the IP address prefix allocated to the MN by the IP subnet that is accessed by the MN before the MN accesses the IP subnet on which the IP address anchor is located, where the target entry includes a correspondence among the node identifier of the MN, the network identifier corresponding to the IP address anchor, the IP address prefix allocated by the IP address anchor, and the validity period of the IP address prefix allocated by the IP address anchor.

With reference to the seventh possible implementation of the first aspect, in a ninth possible implementation of the first aspect, the method further includes:

detecting, by the IP address anchor, whether the valid IP address prefix includes a target IP address prefix, where the target IP address prefix is an IP address prefix that has not been used by a network session after preset duration elapses; and if the valid IP address prefix includes the target IP address prefix, sending, by the IP address anchor to the LM, an entry deletion instruction that carries the node identifier of the MN and the target IP address prefix, so that the LM deletes an entry that records a correspondence between the node identifier of the MN and the target IP address prefix.

According to a second aspect, an IP address management method is provided, where the method includes:

receiving, by a mobile node MN after accessing an IP subnet on which an IP address anchor is located, switchover indication information sent by the IP address anchor; and determining, by the MN according to the switchover indication information, whether the accessed IP subnet has changed.

In a first possible implementation of the second aspect, the switchover indication information includes an IP address prefix allocated by the IP address anchor, an IP address prefix allocated by another IP address anchor, and a type identifier, where the type identifier is used to differentially identify the IP address prefix allocated by the IP address anchor and the IP address prefix allocated by the another IP address anchor; and the determining, by the MN according to the switchover indication information, whether the accessed IP subnet has changed includes:

determining, by the MN, whether the IP address prefix allocated by the IP address anchor meets a preset condition, where the preset condition is: the IP address prefix allocated by the IP address anchor does not exist in previous switchover indication information received by the MN, or the IP address prefix allocated by the IP address anchor exists in previous switchover indication information received by the MN and is identified as being allocated by the another IP address anchor; and if the IP address prefix allocated by the IP address anchor meets the preset condition, determining, by the MN, that the accessed IP subnet has changed; or if the IP address prefix allocated by the IP address anchor does not meet the preset condition, determining, by the MN, that the accessed IP subnet has not changed.

With reference to the second aspect, in a second possible implementation of the second aspect, the switchover indication information includes a first indicator or a second indicator, where the first indicator is used to indicate that the IP subnet accessed by the MN has changed, and the second indicator is used to indicate that the IP subnet accessed by the MN has not changed; and the determining, by the MN according to the switchover indication information, whether the accessed IP subnet has changed includes:

when the switchover indication information includes the first indicator, determining, by the MN, that the accessed IP subnet has changed; or when the switchover indication information includes the second indicator, determining, by the MN, that the accessed IP subnet has not changed.

With reference to the second possible implementation of the second aspect, in a third possible implementation of the second aspect, the method further includes:

receiving, by the MN, a router advertisement message sent by the IP address anchor, where the router advertisement message includes an IP address prefix allocated by the IP address anchor, an IP address prefix allocated by another IP address anchor, and a type identifier, where the type identifier is used to differentially identify the IP address prefix allocated by the IP address anchor and the IP address prefix allocated by the another IP address anchor.

With reference to the first or the third possible implementation of the second aspect, in a fourth possible implementation of the second aspect, the type identifier includes a first type identifier and/or a second type identifier;

the first type identifier is correspondingly set for the IP address prefix allocated by the IP address anchor; and the second type identifier is correspondingly set for the IP address prefix allocated by the another IP address anchor.

With reference to the first or the third possible implementation of the second aspect, in a fifth possible implementation of the second aspect, the method further includes:

differentiating, by the MN according to the type identifier, between the IP address prefix allocated by the IP address anchor and the IP address prefix allocated by the another IP address anchor.

With reference to the fifth possible implementation of the second aspect, in a sixth possible implementation of the second aspect, the method further includes:

when the MN needs to initiate a new network session to a correspondent node CN, selecting and using, by the MN, a preferential IP address as a source IP address for the new network session, where the preferential IP address is an IP address generated according to the IP address prefix allocated by the IP address anchor and a host address of the MN.

With reference to the fifth possible implementation of the second aspect, in a seventh possible implementation of the second aspect, the method further includes:

determining, by the MN, whether a preferential IP address can be used as a source IP address for an existing network session with a correspondent node CN, where the preferential IP address is an IP address generated according to the IP address prefix allocated by the IP address anchor and a host address of the MN; and if the preferential IP address can be used as the source IP address for the existing network session, selecting and using, by the MN, the preferential IP address as the source IP address for the existing network session; or if the preferential IP address cannot be used as the source IP address for the existing network session, keeping, by the MN, a source IP address used for the existing network session unchanged.

With reference to the seventh possible implementation of the second aspect, in an eighth possible implementation of the second aspect, the determining, by the MN, whether a preferential IP address can be used as a source IP address for an existing network session with a CN includes:

obtaining, by the MN, configuration information of an application program corresponding to the existing network session, and determining, according to the configuration information, whether the preferential IP address can be used as the source IP address for the existing network session; or obtaining, by the MN, a transport layer protocol used by an application program corresponding to the existing network session, and determining, according to the transport layer protocol, whether the preferential IP address can be used as the source IP address for the existing network session.

With reference to the second aspect, or the first, the second, the third, the fourth, the fifth, the sixth, the seventh, or the eighth possible implementation of the second aspect, in a ninth possible implementation of the second aspect, the method further includes:

when the MN determines that the accessed IP subnet has changed, querying for and obtaining, by the MN, an IP address of a correspondent node CN that is closest to the MN; and establishing, by the MN, a network session with the closest CN according to the IP address.

According to a third aspect, an IP address management apparatus is provided, where the apparatus is applied to an IP address anchor, and the apparatus includes:

an address obtaining module, configured to: when it is detected that a mobile node MN accesses an IP subnet on which the IP address anchor is located, obtain a valid IP address prefix being used by the MN; and an information sending module, configured to send switchover indication information to the MN according to the valid IP address prefix, so that the MN determines, according to the switchover indication information, whether the accessed IP subnet has changed.

In a first possible implementation of the third aspect, the information sending module includes:

an address judging submodule, configured to determine whether the valid IP address prefix already includes an IP address prefix allocated by the IP address anchor;

a prefix allocation submodule, configured to allocate an IP address prefix to the MN when the valid IP address prefix does not include an IP address prefix allocated by the IP address anchor;

a differential identification submodule, configured to differentially identify the IP address prefix allocated by the IP address anchor and an IP address prefix that is in the valid IP address prefix and that is allocated by another IP address anchor; and a first sending submodule, configured to send the switchover indication information to the MN, where the switchover indication information includes the IP address prefix allocated by the IP address anchor, the IP address prefix allocated by the another IP address anchor, and a type identifier, where the type identifier is used to differentially identify the IP address prefix allocated by the IP address anchor and the IP address prefix allocated by the another IP address anchor.

With reference to the third aspect, in a second possible implementation of the third aspect, the information sending module includes:

a change determining submodule, configured to determine, according to the valid IP address prefix, whether the IP subnet accessed by the MN has changed; and a second sending submodule, configured to send the switchover indication information to the MN according to a determining result, where the switchover indication information includes a first indicator or a second indicator, where the first indicator is used to indicate that the IP subnet accessed by the MN has changed, and the second indicator is used to indicate that the IP subnet accessed by the MN has not changed.

With reference to the second possible implementation of the third aspect, in a third possible implementation of the third aspect, the change determining submodule includes:

an address judging submodule, configured to determine whether the valid IP address prefix already includes an IP address prefix allocated by the IP address anchor;

a first determining submodule, configured to: when the valid IP address prefix does not include an IP address prefix allocated by the IP address anchor, determine that the IP subnet accessed by the MN has changed;

an identifier judging submodule, configured to: when the valid IP address prefix already includes an IP address prefix allocated by the IP address anchor, determine whether the IP address prefix allocated by the IP address anchor has a corresponding preset identifier, where the preset identifier is corresponding to an IP address prefix allocated to the MN by an IP subnet that is accessed by the MN before the MN accesses the IP subnet on which the IP address anchor is located; and a second determining submodule, configured to: when the IP address prefix allocated by the IP address anchor has the corresponding preset identifier, determine that the IP subnet accessed by the MN has not changed, where the first determining submodule is further configured to: when the IP address prefix allocated by the IP address anchor does not have the corresponding preset identifier, determine that the IP subnet accessed by the MN has changed.

With reference to the third possible implementation of the third aspect, in a fourth possible implementation of the third aspect, the apparatus further includes:

a prefix allocation submodule, configured to allocate an IP address prefix to the MN when the valid IP address prefix does not include an IP address prefix allocated by the IP address anchor;

a differential identification submodule, configured to differentially identify the IP address prefix allocated by the IP address anchor and an IP address prefix that is in the valid IP address prefix and that is allocated by another IP address anchor; and a message sending submodule, configured to send a router advertisement message to the MN, where the router advertisement message includes the IP address prefix allocated by the IP address anchor, the IP address prefix allocated by the another IP address anchor, and a type identifier, where the type identifier is used to differentially identify the IP address prefix allocated by the IP address anchor and the IP address prefix allocated by the another IP address anchor.

With reference to the first or the fourth possible implementation of the third aspect, in a fifth possible implementation of the third aspect, the differential identification submodule is specifically configured to:

correspondingly set a first type identifier for the IP address prefix allocated by the IP address anchor; and/or correspondingly set a second type identifier for the IP address prefix allocated by the another IP address anchor.

With reference to the first or the third possible implementation of the third aspect, in a sixth possible implementation of the third aspect, the address judging submodule includes:

a network identifier judging submodule, configured to determine whether a network identifier corresponding to each valid IP address prefix includes a network identifier corresponding to the IP address anchor, where the network identifier is an anchor identifier or a network code;

a first determining submodule, configured to: when the network identifier corresponding to the IP address anchor exists, determine that the valid IP address prefix already includes an IP address prefix allocated by the IP address anchor; and a second determining submodule, configured to: when the network identifier corresponding to the IP address anchor does not exist, determine that the valid IP address prefix does not include an IP address prefix allocated by the IP address anchor.

With reference to the sixth possible implementation of the third aspect, in a seventh possible implementation of the third aspect, the address obtaining module includes:

a request obtaining submodule, configured to send, to a location manager LM, an information obtaining request that carries a node identifier of the MN, so that the LM searches for and obtains, from a prestored entry according to the node identifier of the MN, the valid IP address prefix being used by the MN and the network identifier corresponding to each valid IP address prefix, where each entry includes a correspondence among a node identifier, a network identifier, an IP address prefix, and a validity period of the IP address prefix, and the IP address prefix allocated to the MN by the IP subnet that is accessed by the MN before the MN accesses the IP subnet on which the IP address anchor is located further has the corresponding preset identifier; and an address receiving submodule, configured to receive the valid IP address prefix and the network identifier corresponding to each valid IP address prefix, where the valid IP address prefix and the network identifier are fed back by the LM.

With reference to the seventh possible implementation of the third aspect, in an eighth possible implementation of the third aspect, the apparatus further includes:

a request storage submodule, configured to send an information storage request to the LM, where the information storage request carries the node identifier of the MN, the network identifier corresponding to the IP address anchor, the IP address prefix allocated by the IP address anchor, and a validity period of the IP address prefix allocated by the IP address anchor, so that the LM stores a target entry according to the information storage request, correspondingly sets the preset identifier in the target entry, and removes the preset identifier from an entry that records the IP address prefix allocated to the MN by the IP subnet that is accessed by the MN before the MN accesses the IP subnet on which the IP address anchor is located, where the target entry includes a correspondence among the node identifier of the MN, the network identifier corresponding to the IP address anchor, the IP address prefix allocated by the IP address anchor, and the validity period of the IP address prefix allocated by the IP address anchor.

With reference to the seventh possible implementation of the third aspect, in a ninth possible implementation of the third aspect, the apparatus further includes:

an address detection submodule, configured to detect whether the valid IP address prefix includes a target IP address prefix, where the target IP address prefix is an IP address prefix that has not been used by a network session after preset duration elapses; and an instruction sending submodule, configured to: when the valid IP address prefix includes the target IP address prefix, send, to the LM, an entry deletion instruction that carries the node identifier of the MN and the target IP address prefix, so that the LM deletes an entry that records a correspondence between the node identifier of the MN and the target IP address prefix.

According to a fourth aspect, an IP address management apparatus is provided, where the apparatus is applied to a mobile node MN, and the apparatus includes:

an information receiving module, configured to: after an IP subnet on which an IP address anchor is located is accessed, receive switchover indication information sent by the IP address anchor; and a change judging module, configured to determine, according to the switchover indication information, whether the accessed IP subnet has changed.

In a first possible implementation of the fourth aspect, the switchover indication information includes an IP address prefix allocated by the IP address anchor, an IP address prefix allocated by another IP address anchor, and a type identifier, where the type identifier is used to differentially identify the IP address prefix allocated by the IP address anchor and the IP address prefix allocated by the another IP address anchor; and the change judging module includes:

a condition judging submodule, configured to determine whether the IP address prefix allocated by the IP address anchor meets a preset condition, where the preset condition is: the IP address prefix allocated by the IP address anchor does not exist in previous switchover indication information received by the MN, or the IP address prefix allocated by the IP address anchor exists in previous switchover indication information received by the MN and is identified as being allocated by the another IP address anchor;

a third determining submodule, configured to: when the IP address prefix allocated by the IP address anchor meets the preset condition, determine that the accessed IP subnet has changed; and a fourth determining submodule, configured to: when the IP address prefix allocated by the IP address anchor does not meet the preset condition, determine that the accessed IP subnet has not changed.

With reference to the fourth aspect, in a second possible implementation of the fourth aspect, the switchover indication information includes a first indicator or a second indicator, where the first indicator is used to indicate that the IP subnet accessed by the MN has changed, and the second indicator is used to indicate that the IP subnet accessed by the MN has not changed; and the change judging module includes:

a fifth determining submodule, configured to: when the switchover indication information includes the first indicator, determine that the accessed IP subnet has changed; and a sixth determining submodule, configured to: when the switchover indication information includes the second indicator, determine that the accessed IP subnet has not changed.

With reference to the second possible implementation of the fourth aspect, in a third possible implementation of the fourth aspect, the apparatus further includes:

a message receiving submodule, configured to receive a router advertisement message sent by the IP address anchor, where the router advertisement message includes an IP address prefix allocated by the IP address anchor, an IP address prefix allocated by another IP address anchor, and a type identifier, where the type identifier is used to differentially identify the IP address prefix allocated by the IP address anchor and the IP address prefix allocated by the another IP address anchor.

With reference to the first or the third possible implementation of the fourth aspect, in a fourth possible implementation of the fourth aspect, the type identifier includes a first type identifier and/or a second type identifier;

the first type identifier is correspondingly set for the IP address prefix allocated by the IP address anchor; and the second type identifier is correspondingly set for the IP address prefix allocated by the another IP address anchor.

With reference to the first or the third possible implementation of the fourth aspect, in a fifth possible implementation of the fourth aspect, the apparatus further includes:

an address differentiation submodule, configured to differentiate, according to the type identifier, between the IP address prefix allocated by the IP address anchor and the IP address prefix allocated by the another IP address anchor.

With reference to the fifth possible implementation of the fourth aspect, in a sixth possible implementation of the fourth aspect, the apparatus further includes:

a first selection submodule, configured to: when the MN needs to initiate a new network session to a correspondent node CN, select and use a preferential IP address as a source IP address for the new network session, where the preferential IP address is an IP address generated according to the IP address prefix allocated by the IP address anchor and a host address of the MN.

With reference to the fifth possible implementation of the fourth aspect, in a seventh possible implementation of the fourth aspect, the apparatus further includes:

a session judging submodule, configured to determine whether a preferential IP address can be used as a source IP address for an existing network session with a correspondent node CN, where the preferential IP address is an IP address generated according to the IP address prefix allocated by the IP address anchor and a host address of the MN;

a second selection submodule, configured to: when the preferential IP address can be used as the source IP address for the existing network session, select and use the preferential IP address as the source IP address for the existing network session; and a third selection submodule, configured to: when the preferential IP address cannot be used as the source IP address for the existing network session, keep a source IP address used for the existing network session unchanged.

With reference to the seventh possible implementation of the fourth aspect, in an eighth possible implementation of the fourth aspect, the session judging submodule is specifically configured to:

obtain configuration information of an application program corresponding to the existing network session, and determine, according to the configuration information, whether the preferential IP address can be used as the source IP address for the existing network session; or obtain a transport layer protocol used by an application program corresponding to the existing network session, and determine, according to the transport layer protocol, whether the preferential IP address can be used as the source IP address for the existing network session.

With reference to the fourth aspect, or the first, the second, the third, the fourth, the fifth, the sixth, the seventh, or the eighth possible implementation of the fourth aspect, in a ninth possible implementation of the fourth aspect, the apparatus further includes:

an address query module, configured to: when the MN determines that the accessed IP subnet has changed, query for and obtain an IP address of a correspondent node CN that is closest to the MN; and a session establishment module, configured to establish a network session with the closest CN according to the IP address.

According to a fifth aspect, an IP address anchor is provided, where the IP address anchor includes a processor, a memory, and a transceiver, where the memory is configured to store one or more instructions, and the instruction is configured to be executed by the processor;

the processor is configured to: when it is detected that a mobile node MN accesses an IP subnet on which the IP address anchor is located, obtain a valid IP address prefix being used by the MN; and the processor is further configured to control, according to the valid IP address prefix, the transceiver to send switchover indication information to the MN, so that the MN determines, according to the switchover indication information, whether the accessed IP subnet has changed.

In a first possible implementation of the fifth aspect, the processor is specifically configured to:

determine whether the valid IP address prefix already includes an IP address prefix allocated by the IP address anchor;

if the valid IP address prefix does not include an IP address prefix allocated by the IP address anchor, allocate an IP address prefix to the MN, and differentially identify the IP address prefix allocated by the IP address anchor and an IP address prefix that is in the valid IP address prefix and that is allocated by another IP address anchor; or if the valid IP address prefix already includes an IP address prefix allocated by the IP address anchor, differentially identify the IP address prefix allocated by the IP address anchor and an IP address prefix that is in the valid IP address prefix and that is allocated by another IP address anchor; and control the transceiver to send the switchover indication information to the MN, where the switchover indication information includes the IP address prefix allocated by the IP address anchor, the IP address prefix allocated by the another IP address anchor, and a type identifier, where the type identifier is used to differentially identify the IP address prefix allocated by the IP address anchor and the IP address prefix allocated by the another IP address anchor.

With reference to the fifth aspect, in a second possible implementation of the fifth aspect, the processor is specifically configured to:

determine, according to the valid IP address prefix, whether the IP subnet accessed by the MN has changed; and control, according to a determining result, the transceiver to send the switchover indication information to the MN, where the switchover indication information includes a first indicator or a second indicator, where the first indicator is used to indicate that the IP subnet accessed by the MN has changed, and the second indicator is used to indicate that the IP subnet accessed by the MN has not changed.

With reference to the second possible implementation of the fifth aspect, in a third possible implementation of the fifth aspect, the processor is specifically configured to:

determine whether the valid IP address prefix already includes an IP address prefix allocated by the IP address anchor;

if the valid IP address prefix does not include an IP address prefix allocated by the IP address anchor, determine that the IP subnet accessed by the MN has changed; or if the valid IP address prefix already includes an IP address prefix allocated by the IP address anchor, determine whether the IP address prefix allocated by the IP address anchor has a corresponding preset identifier, where the preset identifier is corresponding to an IP address prefix allocated to the MN by an IP subnet that is accessed by the MN before the MN accesses the IP subnet on which the IP address anchor is located; and if the IP address prefix allocated by the IP address anchor has the corresponding preset identifier, determine that the IP subnet accessed by the MN has not changed; or if the IP address prefix allocated by the IP address anchor does not have the corresponding preset identifier, determine that the IP subnet accessed by the MN has changed.

With reference to the third possible implementation of the fifth aspect, in a fourth possible implementation of the fifth aspect, the processor is further configured to: if the valid IP address prefix does not include an IP address prefix allocated by the IP address anchor, allocate an IP address prefix to the MN, and differentially identify the IP address prefix allocated by the IP address anchor and an IP address prefix that is in the valid IP address prefix and that is allocated by another IP address anchor;

the processor is further configured to: if the valid IP address prefix already includes an IP address prefix allocated by the IP address anchor, differentially identify the IP address prefix allocated by the IP address anchor and an IP address prefix that is in the valid IP address prefix and that is allocated by another IP address anchor; and the processor is further configured to control the transceiver to send a router advertisement message to the MN, where the router advertisement message includes the IP address prefix allocated by the IP address anchor, the IP address prefix allocated by the another IP address anchor, and a type identifier, where the type identifier is used to differentially identify the IP address prefix allocated by the IP address anchor and the IP address prefix allocated by the another IP address anchor.

With reference to the first or the fourth possible implementation of the fifth aspect, in a fifth possible implementation of the fifth aspect, the processor is specifically configured to:

correspondingly set a first type identifier for the IP address prefix allocated by the IP address anchor; and/or correspondingly set a second type identifier for the IP address prefix allocated by the another IP address anchor.

With reference to the first or the third possible implementation of the fifth aspect, in a sixth possible implementation of the fifth aspect, the processor is specifically configured to:

determine whether a network identifier corresponding to each valid IP address prefix includes a network identifier corresponding to the IP address anchor, where the network identifier is an anchor identifier or a network code; and if the network identifier corresponding to the IP address anchor exists, determine that the valid IP address prefix already includes an IP address prefix allocated by the IP address anchor; or if the network identifier corresponding to the IP address anchor does not exist, determine that the valid IP address prefix does not include an IP address prefix allocated by the IP address anchor.

With reference to the sixth possible implementation of the fifth aspect, in a seventh possible implementation of the fifth aspect, the processor is specifically configured to:

control the transceiver to send, to a location manager LM, an information obtaining request that carries a node identifier of the MN, so that the LM searches for and obtains, from a prestored entry according to the node identifier of the MN, the valid IP address prefix being used by the MN and the network identifier corresponding to each valid IP address prefix, where each entry includes a correspondence among a node identifier, a network identifier, an IP address prefix, and a validity period of the IP address prefix, and the IP address prefix allocated to the MN by the IP subnet that is accessed by the MN before the MN accesses the IP subnet on which the IP address anchor is located further has the corresponding preset identifier; and control the transceiver to receive the valid IP address prefix and the network identifier corresponding to each valid IP address prefix, where the valid IP address prefix and the network identifier are fed back by the LM.

With reference to the seventh possible implementation of the fifth aspect, in an eighth possible implementation of the fifth aspect, the processor is further configured to control the transceiver to send an information storage request to the LM, where the information storage request carries the node identifier of the MN, the network identifier corresponding to the IP address anchor, the IP address prefix allocated by the IP address anchor, and a validity period of the IP address prefix allocated by the IP address anchor, so that the LM stores a target entry according to the information storage request, correspondingly sets the preset identifier in the target entry, and removes the preset identifier from an entry that records the IP address prefix allocated to the MN by the IP subnet that is accessed by the MN before the MN accesses the IP subnet on which the IP address anchor is located, where the target entry includes a correspondence among the node identifier of the MN, the network identifier corresponding to the IP address anchor, the IP address prefix allocated by the IP address anchor, and the validity period of the IP address prefix allocated by the IP address anchor.

With reference to the seventh possible implementation of the fifth aspect, in a ninth possible implementation of the fifth aspect, the processor is further configured to detect whether the valid IP address prefix includes a target IP address prefix, where the target IP address prefix is an IP address prefix that has not been used by a network session after preset duration elapses; and the processor is further configured to: if the valid IP address prefix includes the target IP address prefix, control the transceiver to send, to the LM, an entry deletion instruction that carries the node identifier of the MN and the target IP address prefix, so that the LM deletes an entry that records a correspondence between the node identifier of the MN and the target IP address prefix.

According to a sixth aspect, a mobile node MN is provided, where the MN includes a processor, a memory, and a transceiver, where the memory is configured to store one or more instructions, and the instruction is configured to be executed by the processor;

the processor is configured to: after an IP subnet on which an IP address anchor is located is accessed, control the transceiver to receive switchover indication information sent by the IP address anchor; and the processor is further configured to determine, according to the switchover indication information, whether the accessed IP subnet has changed.

In a first possible implementation of the sixth aspect, the switchover indication information includes an IP address prefix allocated by the IP address anchor, an IP address prefix allocated by another IP address anchor, and a type identifier, where the type identifier is used to differentially identify the IP address prefix allocated by the IP address anchor and the IP address prefix allocated by the another IP address anchor; and the processor is specifically configured to:

determine whether the IP address prefix allocated by the IP address anchor meets a preset condition, where the preset condition is: the IP address prefix allocated by the IP address anchor does not exist in previous switchover indication information received by the MN, or the IP address prefix allocated by the IP address anchor exists in previous switchover indication information received by the MN and is identified as being allocated by the another IP address anchor; and if the IP address prefix allocated by the IP address anchor meets the preset condition, determine that the accessed IP subnet has changed; or if the IP address prefix allocated by the IP address anchor does not meet the preset condition, determine that the accessed IP subnet has not changed.

With reference to the sixth aspect, in a second possible implementation of the sixth aspect, the switchover indication information includes a first indicator or a second indicator, where the first indicator is used to indicate that the IP subnet accessed by the MN has changed, and the second indicator is used to indicate that the IP subnet accessed by the MN has not changed; and the processor is specifically configured to:

when the switchover indication information includes the first indicator, determine that the accessed IP subnet has changed; or when the switchover indication information includes the second indicator, determine that the accessed IP subnet has not changed.

With reference to the second possible implementation of the sixth aspect, in a third possible implementation of the sixth aspect, the processor is further configured to control the transceiver to receive a router advertisement message sent by the IP address anchor, where the router advertisement message includes an IP address prefix allocated by the IP address anchor, an IP address prefix allocated by another IP address anchor, and a type identifier, where the type identifier is used to differentially identify the IP address prefix allocated by the IP address anchor and the IP address prefix allocated by the another IP address anchor.

With reference to the first or the third possible implementation of the sixth aspect, in a fourth possible implementation of the sixth aspect, the type identifier includes a first type identifier and/or a second type identifier;

the first type identifier is correspondingly set for the IP address prefix allocated by the IP address anchor; and the second type identifier is correspondingly set for the IP address prefix allocated by the another IP address anchor.

With reference to the first or the third possible implementation of the sixth aspect, in a fifth possible implementation of the sixth aspect, the processor is further configured to differentiate, according to the type identifier, between the IP address prefix allocated by the IP address anchor and the IP address prefix allocated by the another IP address anchor.

With reference to the fifth possible implementation of the sixth aspect, in a sixth possible implementation of the sixth aspect, the processor is further configured to: when the MN needs to initiate a new network session to a correspondent node CN, select and use a preferential IP address as a source IP address for the new network session, where the preferential IP address is an IP address generated according to the IP address prefix allocated by the IP address anchor and a host address of the MN.

With reference to the fifth possible implementation of the sixth aspect, in a seventh possible implementation of the sixth aspect, the processor is further configured to determine whether a preferential IP address can be used as a source IP address for an existing network session with a correspondent node CN, where the preferential IP address is an IP address generated according to the IP address prefix allocated by the IP address anchor and a host address of the MN; and the processor is further configured to: if the preferential IP address can be used as the source IP address for the existing network session, select and use the preferential IP address as the source IP address for the existing network session; or the processor is further configured to: if the preferential IP address cannot be used as the source IP address for the existing network session, keep a source IP address used for the existing network session unchanged.

With reference to the seventh possible implementation of the sixth aspect, in an eighth possible implementation of the sixth aspect, the processor is specifically configured to:

obtain configuration information of an application program corresponding to the existing network session, and determine, according to the configuration information, whether the preferential IP address can be used as the source IP address for the existing network session; or obtain a transport layer protocol used by an application program corresponding to the existing network session, and determine, according to the transport layer protocol, whether the preferential IP address can be used as the source IP address for the existing network session.

With reference to the sixth aspect, or the first, the second, the third, the fourth, the fifth, the sixth, the seventh, or the eighth possible implementation of the sixth aspect, in a ninth possible implementation of the sixth aspect, the processor is further configured to: when the MN determines that the accessed IP subnet has changed, query for and obtain an IP address of a correspondent node CN that is closest to the MN; and the processor is further configured to establish a network session with the closest CN according to the IP address.

Beneficial effects of the technical solutions provided in the embodiments of the present invention include:

When detecting that the MN accesses the IP subnet on which the IP address anchor is located, the IP address anchor sends the switchover indication information to the MN according to the valid IP address prefix being used by the MN, so that the MN determines, according to the switchover indication information, whether the accessed IP subnet has changed. This resolves the prior-art problem that an MN cannot determine whether an IP subnet accessed by the MN has changed, thereby achieving a technical effect that an MN can accurately determine whether an IP subnet accessed by the MN has changed.

In addition, when providing the MN with a currently available IP address prefix, the IP address anchor differentially identifies, by using the type identifier, the IP address prefix allocated by the IP address anchor and the IP address prefix allocated by the another IP address anchor, so that the MN may differentiate, based on the type identifier, between the foregoing two different types of IP address prefixes. Further, the MN selects and uses the preferential IP address as the source IP address for the new network session and the existing network session for which an IP address change can be handled, thereby achieving a technical effect of reducing route redundancy.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
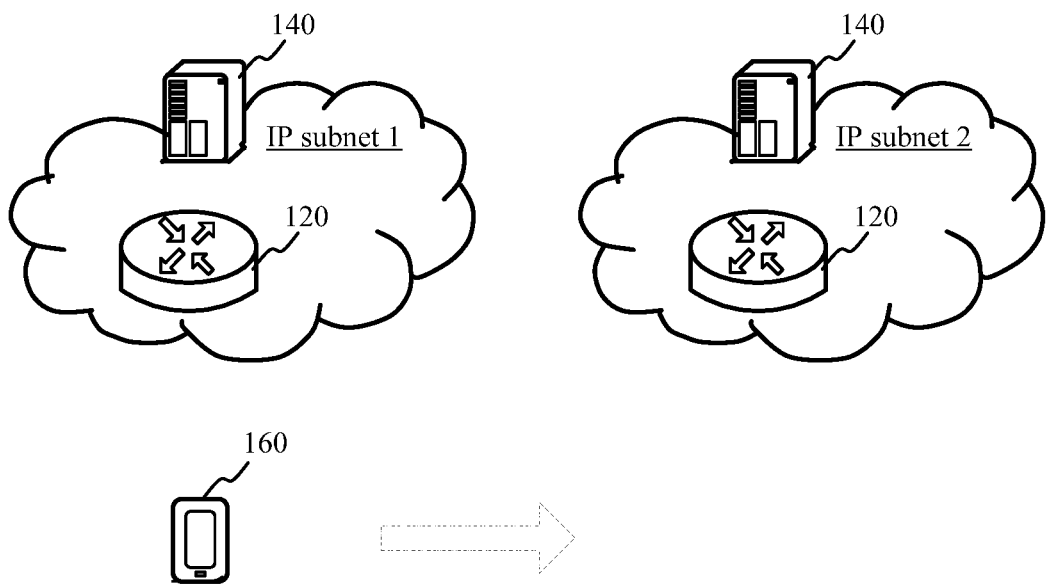
FIG. 1 is a schematic diagram of an implementation environment according to an embodiment of the present invention.

Referring to FIG. 1, FIG. 1 is a schematic diagram of an implementation environment according to an embodiment of the present invention. The implementation environment includes multiple IP subnets. An IP subnet 1 and an IP subnet 2 are used as examples in FIG. 1. An IP address anchor 120 and a CN 140 are correspondingly deployed on each IP subnet. The implementation environment further includes an MN 160 that can move among the multiple IP subnets.

The MN 160 may be a mobile terminal device such as a mobile phone, a tablet computer, or a portable computer.

The IP address anchor 120 is configured to provide mobility support for the MN 160. In a possible implementation, the IP address anchor 120 may be a gateway device, such as a public data network (English: Public Data Network, PND for short) gateway PGW.

The CN 140 may be a server configured to provide a network service for the MN 160. For example, the network service may be a download service, a video service, a network phone service, or the like. CNs 140 on different IP subnets may have a same service function and service resource, or may have different service functions and service resources.

Figure 2:
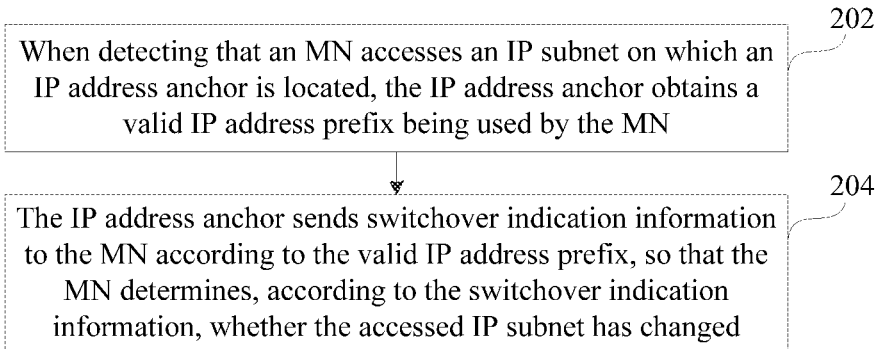
FIG. 2 is a flowchart of an IP address management method according to an embodiment of the present invention.

Referring to FIG. 2, FIG. 2 is a flowchart of an IP address management method according to an embodiment of the present invention. In this embodiment, description is provided by using an example in which the IP address management method is applied to the IP address anchor 120 in the implementation environment shown in FIG. 1. The IP address management method may include the following steps:

Step 202: When detecting that an MN accesses an IP subnet on which an IP address anchor is located, the IP address anchor obtains a valid IP address prefix being used by the MN.

Step 204: The IP address anchor sends switchover indication information to the MN according to the valid IP address prefix, so that the MN determines, according to the switchover indication information, whether the accessed IP subnet has changed.

To sum up, according to the IP address management method provided in this embodiment, when detecting that the MN accesses the IP subnet on which the IP address anchor is located, the IP address anchor sends the switchover indication information to the MN according to the valid IP address prefix being used by the MN. This resolves a prior-art problem that an MN cannot determine whether an IP subnet accessed by the MN has changed, thereby achieving a technical effect that an MN can accurately determine whether an IP subnet accessed by the MN has changed.

Figure 3:
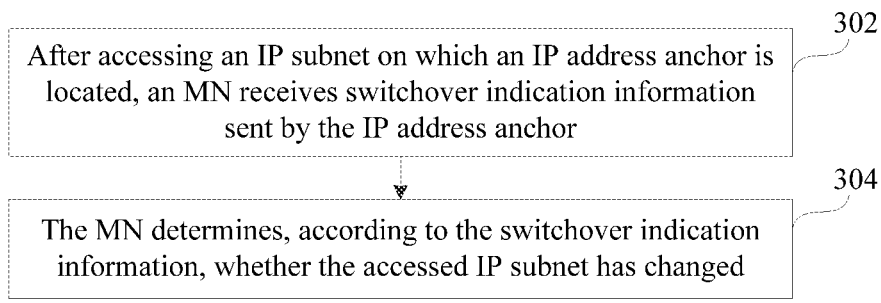
FIG. 3 is a flowchart of an IP address management method according to another embodiment of the present invention.

Referring to FIG. 3, FIG. 3 is a flowchart of an IP address management method according to another embodiment of the present invention. In this embodiment, description is provided by using an example in which the IP address management method is applied to the MN 160 in the implementation environment shown in FIG. 1. The IP address management method may include the following steps:

Step 302: After accessing an IP subnet on which an IP address anchor is located, an MN receives switchover indication information sent by the IP address anchor.

Step 304: The MN determines, according to the switchover indication information, whether the accessed IP subnet has changed.

To sum up, according to the IP address management method provided in this embodiment, the MN receives the switchover indication information sent by the IP address anchor, and determines, according to the switchover indication information, whether the accessed IP subnet has changed. This resolves a prior-art problem that an MN cannot determine whether an IP subnet accessed by the MN has changed, thereby achieving a technical effect that an MN can accurately determine whether an IP subnet accessed by the MN has changed.

Figure 4:
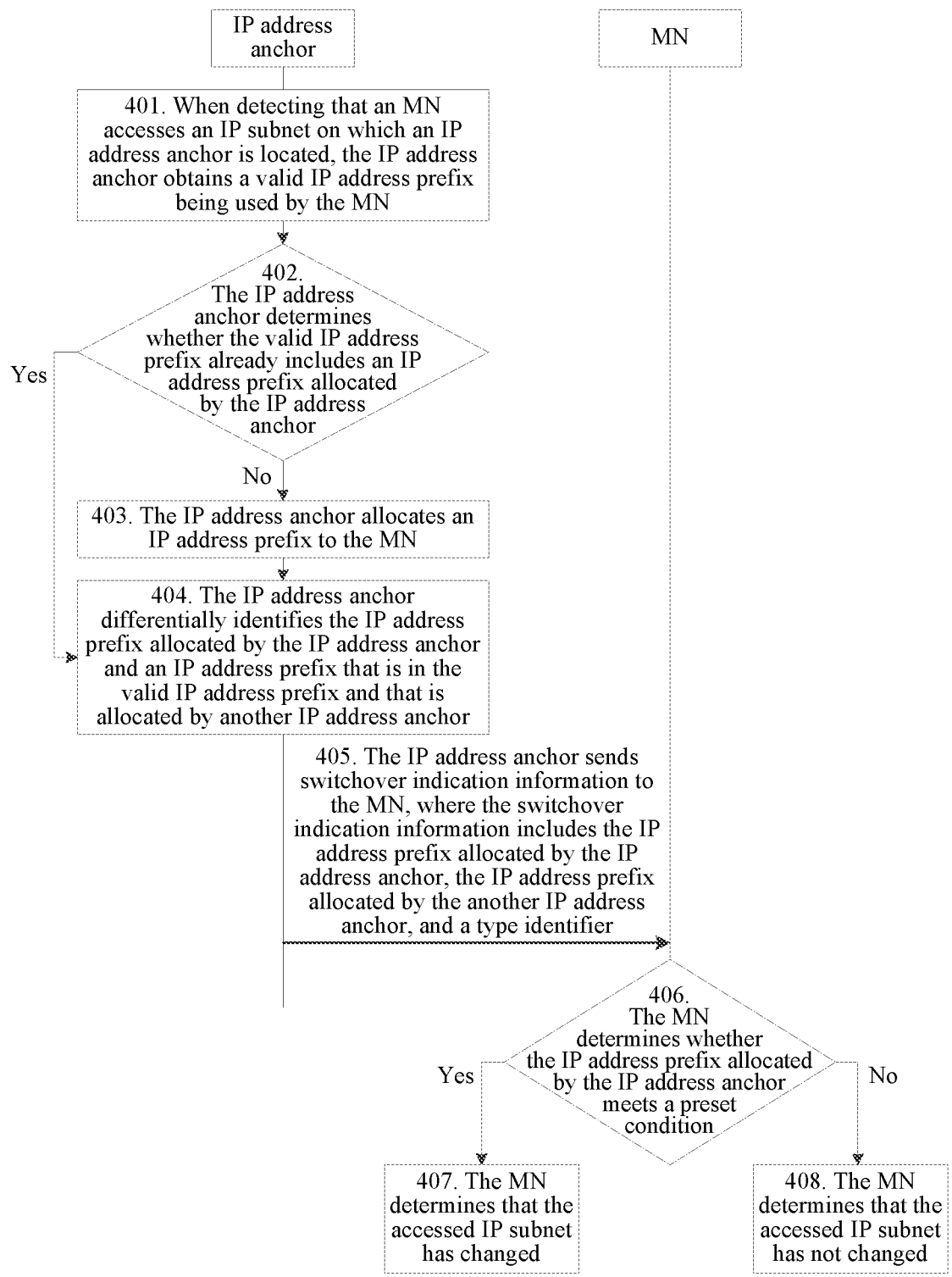
FIG. 4 is a flowchart of an IP address management method according to another embodiment of the present invention.

Referring to FIG. 4, FIG. 4 is a flowchart of an IP address management method according to another embodiment of the present invention. In this embodiment, description is provided by using an example in which the IP address management method is applied to the implementation environment shown in FIG. 1. The IP address management method may include the following steps.

Step 401: When detecting that an MN accesses an IP subnet on which an IP address anchor is located, the IP address anchor obtains a valid IP address prefix being used by the MN.

After allocating an IP address prefix to the MN, the IP address anchor correspondingly sets a validity period of the IP address prefix. An IP address prefix that is in a validity period and that is not released is a valid IP address prefix.

Step 402: The IP address anchor determines whether the valid IP address prefix already includes an IP address prefix allocated by the IP address anchor.

If the valid IP address prefix does not include an IP address prefix allocated by the IP address anchor, the following step 403 is to be performed, and step 404 is to be performed after step 403. If the valid IP address prefix already includes an IP address prefix allocated by the IP address anchor, step 404 is directly to be performed.

With reference to FIG. 1, it is assumed that an IP subnet currently accessed by the MN is an IP subnet 2, and an IP address anchor on the IP subnet 2 is marked as an anchor #2. The MN may move from another IP subnet to the IP subnet 2. Therefore, the valid IP address prefix may include an IP address prefix allocated to the MN by another IP address anchor. For example, provided that the MN moves from an IP subnet 1 to the IP subnet 2 and an IP address anchor on the IP subnet 1 is marked as an anchor #1, a valid IP address prefix that is being used by the MN and that is obtained by the anchor #2 when the anchor #2 detects that the MN accesses the IP subnet 2 may include an IP address prefix allocated to the MN by the anchor #1, where the IP address prefix is marked as a prefix #1.

In addition, if the MN has accessed the IP subnet 2 before, the valid IP address prefix that is being used by the MN and that is obtained by the anchor #2 may include an IP address prefix allocated to the MN by the anchor #2, where the IP address prefix is marked as a prefix #2. For example, provided that the MN moves from the IP subnet 2 to the IP subnet 1 and then moves from the IP subnet 1 to the IP subnet 2, the valid IP address prefix that is being used by the MN and that is obtained by the anchor #2 when the anchor #2 detects that the MN accesses the IP subnet 2 may include the prefix #1 and the prefix #2.

Step 403: The IP address anchor allocates an IP address prefix to the MN.

Still using the foregoing assumption as an example, when the valid IP address prefix being used by the MN does not include an IP address prefix allocated to the MN by the anchor #2, the anchor #2 allocates an IP address prefix to the MN, where the IP address prefix is marked as the prefix #2. Then, the anchor #2 performs the following step 404.

In addition, when the valid IP address prefix being used by the MN already includes an IP address prefix allocated to the MN by the anchor #2, the anchor #2 no longer needs to allocate an IP address prefix to the MN, but directly performs the following step 404.

Step 404: The IP address anchor differentially identifies the IP address prefix allocated by the IP address anchor and an IP address prefix that is in the valid IP address prefix and that is allocated by another IP address anchor.

Specifically, the IP address anchor correspondingly sets a first type identifier for the IP address prefix allocated by the IP address anchor, and/or the IP address anchor correspondingly sets a second type identifier for the IP address prefix allocated by the another IP address anchor.

In this embodiment, an example in which the first type identifier is an H-prefix and the second type identifier is an F-prefix is used.

In a first possible implementation, the IP address anchor correspondingly sets the first type identifier H-prefix for the prefix #2.

In a second possible implementation, the IP address anchor correspondingly sets the second type identifier F-prefix for the prefix #1.

In a third possible implementation, the IP address anchor correspondingly sets the first type identifier H-prefix for the prefix #2, and correspondingly sets the second type identifier F-prefix for the prefix #1.

In the foregoing three possible implementations, an objective of differentially identifying two different types of IP address prefixes can be achieved.

Step 405: The IP address anchor sends switchover indication information to the MN, where the switchover indication information includes the IP address prefix allocated by the IP address anchor, the IP address prefix allocated by the another IP address anchor, and a type identifier.

The type identifier, that is, the first type identifier and/or the second type identifier described in the foregoing step 404, is used to differentially identify the IP address prefix allocated by the IP address anchor and the IP address prefix allocated by the another IP address anchor.

Optionally, the switchover indication information is sent to the MN in a form of a router advertisement (RA for short) message.

Correspondingly, the MN receives the switchover indication information sent by the IP address anchor.

Step 406: The MN determines whether the IP address prefix allocated by the IP address anchor meets a preset condition.

If the IP address prefix allocated by the IP address anchor meets the preset condition, the following step 407 is to be performed. If the IP address prefix allocated by the IP address anchor does not meet the preset condition, the following step 408 is to be performed.

The preset condition is: the IP address prefix allocated by the IP address anchor does not exist in previous switchover indication information received by the MN, or the IP address prefix allocated by the IP address anchor exists in previous switchover indication information received by the MN and is identified as being allocated by the another IP address anchor.

After receiving the switchover indication information sent by the IP address anchor on the IP subnet currently accessed by the MN, the MN can differentiate, according to the type identifier, the IP address prefix allocated by the IP address anchor and the IP address prefix allocated by the another IP address anchor.

Using the third possible implementation of the foregoing step 404 as an example, after receiving switchover indication information sent by the anchor #2, the MN determines, according to the first type identifier H-prefix, that the corresponding prefix #2 is an IP address prefix allocated by the anchor #2. When the prefix #2 does not exist in the previous switchover indication information received by the MN, or when the prefix #2 exists in the previous switchover indication information received by the MN and is corresponding to the second type identifier F-prefix, the MN performs the following step 407. When the prefix #2 exists in the previous switchover indication information received by the MN and is corresponding to the first type identifier H-prefix, the MN performs the following step 408.

Step 407: The MN determines that the accessed IP subnet has changed.

Step 408: The MN determines that the accessed IP subnet has not changed.

To sum up, according to the IP address management method provided in this embodiment, when detecting that the MN accesses the IP subnet on which the IP address anchor is located, the IP address anchor sends the switchover indication information to the MN according to the valid IP address prefix being used by the MN, so that the MN determines, according to the switchover indication information, whether the accessed IP subnet has changed. This resolves a prior-art problem that an MN cannot determine whether an IP subnet accessed by the MN has changed, thereby achieving a technical effect that an MN can accurately determine whether an IP subnet accessed by the MN has changed.

In addition, according to the IP address management method provided in this embodiment, the IP address prefix allocated by the IP address anchor and the IP address prefix allocated by the another IP address anchor are differentially identified by using the type identifier. Therefore, in an aspect, the MN can accurately determine, according to a change between IP address prefixes included in two consecutive pieces of switchover indication information and a corresponding type identifier change, whether the IP subnet accessed by the MN has changed; in another aspect, the MN can easily distinguish the two different types of IP address prefixes according to the type identifier, so as to use the different types of IP address prefixes more appropriately when subsequently performing a network session, and achieve an objective of reducing route redundancy.

In the foregoing embodiment shown in FIG. 4, the MN determines whether the IP subnet accessed by the MN has changed. In the following embodiment shown in FIG. 5A, an IP address anchor determines whether an IP subnet accessed by an MN has changed, and directly notifies the MN of a determining result.

Figure 5A:
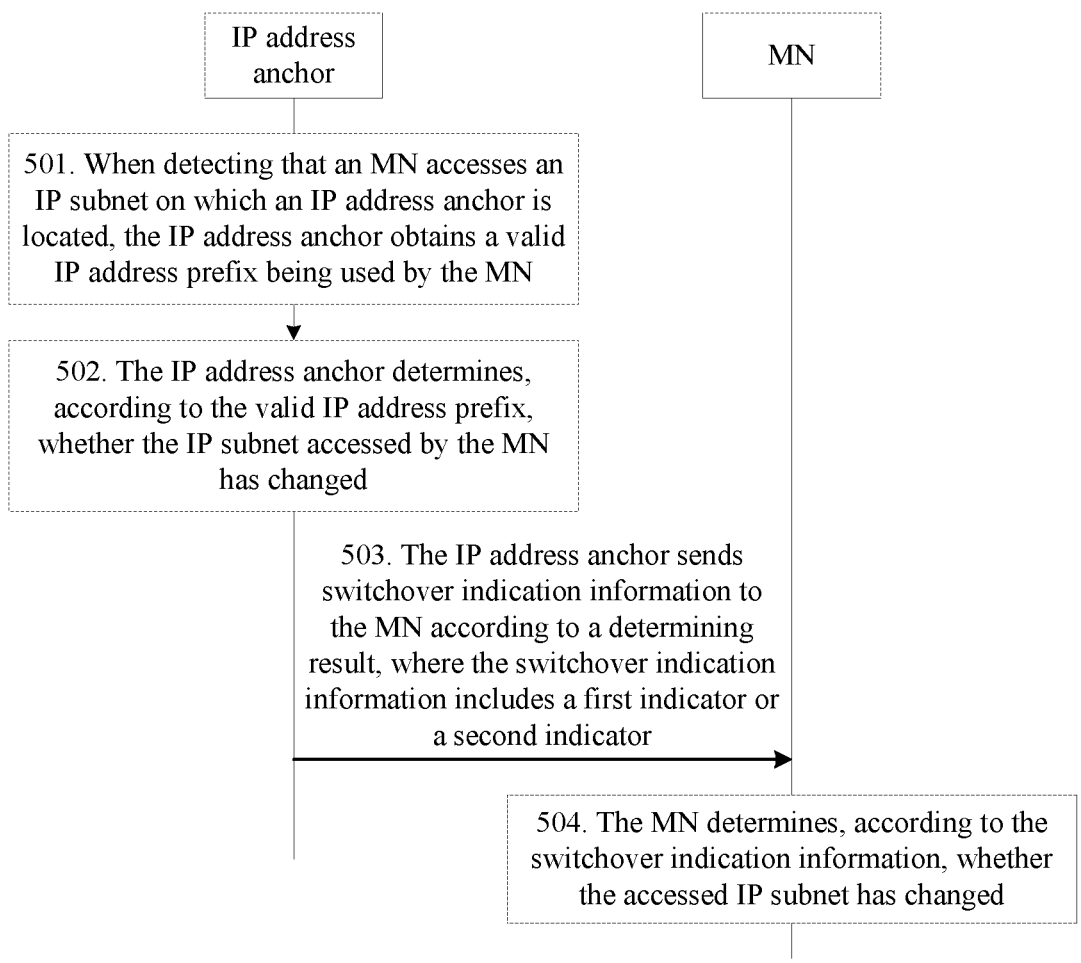
FIG. 5A is a flowchart of an IP address management method according to another embodiment of the present invention.

Referring to FIG. 5A, FIG. 5A is a flowchart of an IP address management method according to another embodiment of the present invention. In this embodiment, description is provided by using an example in which the IP address management method is applied to the implementation environment shown in FIG. 1. The IP address management method may include the following steps.

Step 501: When detecting that an MN accesses an IP subnet on which an IP address anchor is located, the IP address anchor obtains a valid IP address prefix being used by the MN.

Step 502: The IP address anchor determines, according to the valid IP address prefix, whether the IP subnet accessed by the MN has changed.

Figure 5B:
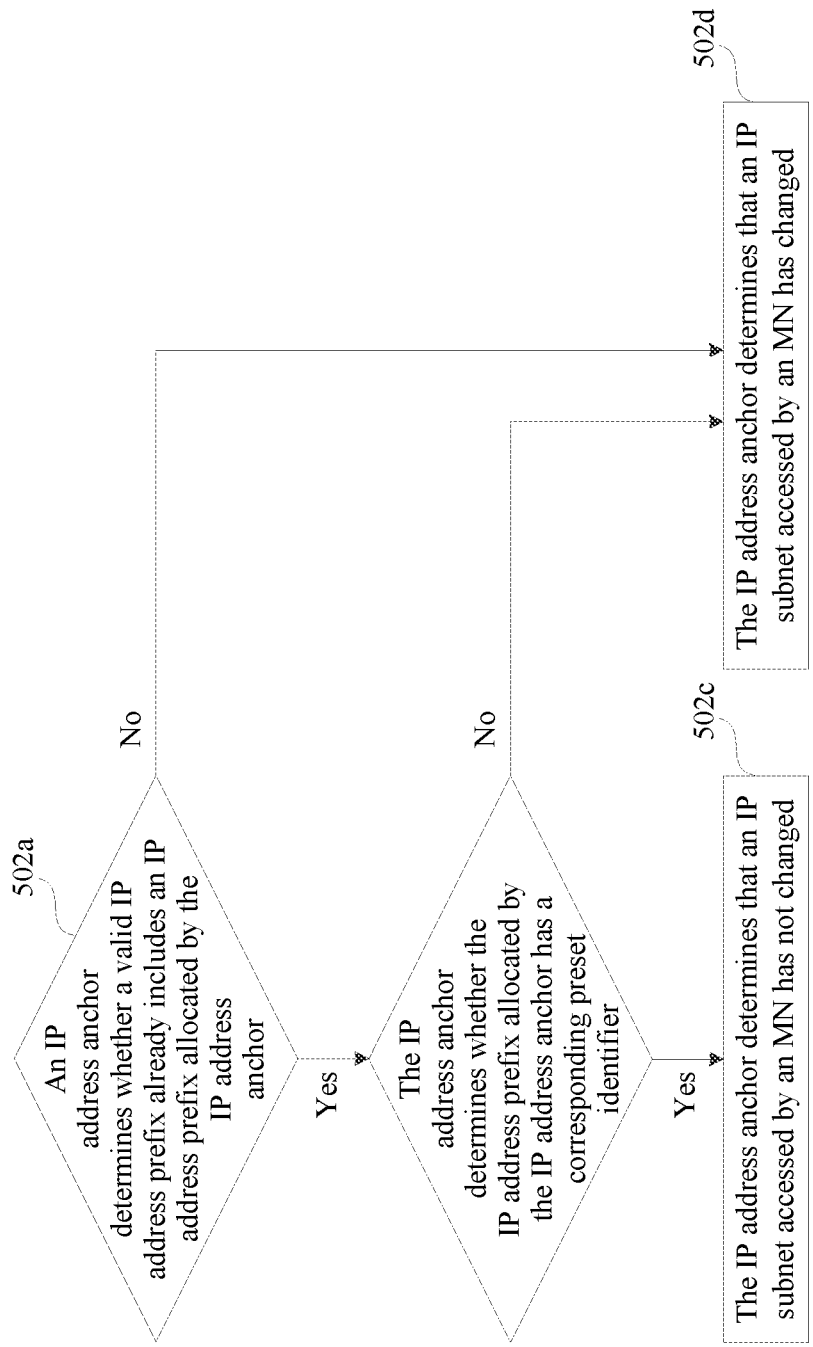
FIG. 5B is a flowchart of step 502 according to the embodiment shown in FIG. 5A.

Specifically, as shown in FIG. 5B, this step may include the following substeps.

Step 502a: The IP address anchor determines whether the valid IP address prefix already includes an IP address prefix allocated by the IP address anchor.

If the valid IP address prefix does not include an IP address prefix allocated by the IP address anchor, the following step 502d is to be performed. If the valid IP address prefix already includes an IP address prefix allocated by the IP address anchor, the following step 502b is to be performed.

With reference to FIG. 1, it is still assumed that an IP subnet currently accessed by the MN is an IP subnet 2, and an IP address anchor on the IP subnet 2 is marked as an anchor #2. It is assumed that the valid IP address prefix that is being used by the MN and that is obtained by the anchor #2 includes a prefix #1, a prefix #2, and a prefix #3. The anchor #2 determines whether the foregoing three IP address prefixes already include an IP address prefix allocated by the anchor #2.

For example, provided that the anchor #2 finds that the foregoing three IP address prefixes are not IP address prefixes allocated to the MN by the anchor #2, the anchor #2 performs the following step 502d, and determines that the IP subnet accessed by the MN has changed.

For another example, provided that the anchor #2 finds that the prefix #1 is an IP address prefix allocated to the MN by the anchor #2, the anchor #2 performs the following step 502b.

Step 502b: The IP address anchor determines whether the IP address prefix allocated by the IP address anchor has a corresponding preset identifier.

If the IP address prefix allocated by the IP address anchor has the corresponding preset identifier, the following step 502c is to be performed. If the IP address prefix allocated by the IP address anchor does not have the corresponding preset identifier, the following step 502d is to be performed.

The preset identifier is corresponding to an IP address prefix allocated to the MN by an IP subnet that is accessed by the MN before the MN accesses the IP subnet on which the IP address anchor is located. For example, the preset identifier may be marked as current anchor.

When the anchor #2 finds that the prefix #1 is an IP address prefix allocated to the MN by the anchor #2, the anchor #2 further determines whether the prefix #1 has the corresponding preset identifier current anchor. When the prefix #1 has the corresponding preset identifier current anchor, it indicates that the IP subnet accessed by the MN has not changed; on the contrary, when the prefix #1 does not have the corresponding preset identifier current anchor, if the prefix #2 or the prefix #3 has the corresponding preset identifier current anchor, it indicates that the IP subnet accessed by the MN has changed.

Step 502c: The IP address anchor determines that the IP subnet accessed by the MN has not changed.

Step 502d: The IP address anchor determines that the IP subnet accessed by the MN has changed.

Step 503: The IP address anchor sends switchover indication information to the MN according to a determining result, where the switchover indication information includes a first indicator or a second indicator.

The first indicator is used to indicate that the IP subnet accessed by the MN has changed, and the second indicator is used to indicate that the IP subnet accessed by the MN has not changed.

Correspondingly, the MN receives the switchover indication information sent by the IP address anchor.

Step 504: The MN determines, according to the switchover indication information, whether the accessed IP subnet has changed.

When the switchover indication information includes the first indicator, the MN determines that the accessed IP subnet has changed; or when the switchover indication information includes the second indicator, the MN determines that the accessed IP subnet has not changed.

Optionally, after the foregoing step 502a, the following steps may be further included:

1. If the valid IP address prefix does not include an IP address prefix allocated by the IP address anchor, the IP address anchor allocates an IP address prefix to the MN, and differentially identifies the IP address prefix allocated by the IP address anchor and an IP address prefix that is in the valid IP address prefix and that is allocated by another IP address anchor.

2. If the valid IP address prefix already includes an IP address prefix allocated by the IP address anchor, the IP address anchor differentially identifies the IP address prefix allocated by the IP address anchor and an IP address prefix that is in the valid IP address prefix and that is allocated by another IP address anchor.

3. The IP address anchor sends a router advertisement message to the MN, where the router advertisement message includes the IP address prefix allocated by the IP address anchor, the IP address prefix allocated by the another IP address anchor, and a type identifier.

The type identifier is used to differentially identify the IP address prefix allocated by the IP address anchor and the IP address prefix allocated by the another IP address anchor.

The foregoing steps 1 to 3 have been described in the embodiment shown in FIG. 4. For details, refer to the descriptions in the embodiment shown in FIG. 4. Details are not described herein again in this embodiment.

Correspondingly, the MN receives the router advertisement message sent by the IP address anchor. The MN differentiates, according to the type identifier, between the IP address prefix allocated by the IP address anchor and the IP address prefix allocated by the another IP address anchor.

The IP address anchor notifies, by using the router advertisement message, the MN of a currently available IP address prefix, and differentially identifies, by using the type identifier, the IP address prefix allocated by the IP address anchor and the IP address prefix allocated by the another IP address anchor, so that the MN can easily distinguish the two different types of IP address prefixes according to the type identifier, so as to use the different types of IP address prefixes more appropriately when subsequently performing a network session, and achieve an objective of reducing route redundancy.

Optionally, the switchover indication information may be carried in the router advertisement message and sent to the MN.

To sum up, according to the IP address management method provided in this embodiment, when detecting that the MN accesses the IP subnet on which the IP address anchor is located, the IP address anchor sends the switchover indication information to the MN according to the valid IP address prefix being used by the MN, so that the MN determines, according to the switchover indication information, whether the accessed IP subnet has changed. This resolves a prior-art problem that an MN cannot determine whether an IP subnet accessed by the MN has changed, thereby achieving a technical effect that an MN can accurately determine whether an IP subnet accessed by the MN has changed.

In addition, according to the IP address management method provided in this embodiment, the IP address anchor determines whether the IP subnet accessed by the MN has changed, and directly notifies the MN of the determining result, thereby reducing a processing overhead on an MN side.

It needs to be supplemented that step 402 in the embodiment shown in FIG. 4 and step 502a in the embodiment shown in FIG. 5A, that is, the step of determining, by the IP address anchor, whether the valid IP address prefix already includes an IP address prefix allocated by the IP address anchor, may include the following substeps.

(1). The IP address anchor determines whether a network identifier corresponding to each valid IP address prefix includes a network identifier corresponding to the IP address anchor.

If the network identifier corresponding to each valid IP address prefix includes the network identifier corresponding to the IP address anchor, the following step (2) is to be performed. If the network identifier corresponding to each valid IP address prefix does not include the network identifier corresponding to the IP address anchor, the following step (3) is to be performed.

(2). The IP address anchor determines that the valid IP address prefix already includes an IP address prefix allocated by the IP address anchor.

(3). The IP address anchor determines that the valid IP address prefix does not include an IP address prefix allocated by the IP address anchor.

The network identifier is an anchor identifier or a network code. Different IP address anchors are corresponding to different network identifiers. Using an example in which the network identifier is an anchor identifier, the different IP address anchors may be differentiated by using different anchor identifiers, such as an anchor #1, an anchor #2, and an anchor #3.

When obtaining the valid IP address prefix being used by the MN, the IP address anchor also obtains the network identifier corresponding to each valid IP address prefix, and determines accordingly whether the valid IP address prefix already includes an IP address prefix allocated by the IP address anchor.

For example, the valid IP address prefix that is being used by the MN and that is obtained by the anchor #2 includes the prefix #1, the prefix #2, and the prefix #3, and network identifiers corresponding to the three IP address prefixes are sequentially the anchor #1, the anchor #2, and the anchor #3. Then, the anchor #2 can determine that the three IP address prefixes already include an IP address prefix allocated by the IP address anchor, that is, the prefix #2.

In a possible implementation, an independent entity may be deployed in the implementation environment shown in FIG. 1, where the independent entity is marked as a location manager (LM for short). The LM may cover multiple IP subnets, that is, the LM and IP address anchors may be in a one-to-many relationship. The LM is configured to record a list of a valid IP address prefix allocated to the MN by each IP address anchor. For example, the LM may store multiple entries, and each entry includes a correspondence among a node identifier, a network identifier, an IP address prefix, and a validity period of the IP address prefix. The IP address anchor may query for and obtain, from the LM, the valid IP address prefix being used by the MN.

Specifically, a step of obtaining, by the IP address anchor, the valid IP address prefix being used by the MN may include the following substeps.

First, the IP address anchor sends, to the LM, an information obtaining request that carries a node identifier of the MN, so that the LM searches for and obtains, from a prestored entry according to the node identifier of the MN, the valid IP address prefix being used by the MN and the network identifier corresponding to each valid IP address prefix.

Second, the IP address anchor receives the valid IP address prefix and the network identifier corresponding to each valid IP address prefix, where the valid IP address prefix and the network identifier are fed back by the LM.

For example, the LM stores multiple entries described in the following Table-1.

TABLE 1

| Entry number | Node identifier | Network identifier | IP address prefix | Validity period | Status |
|---|---|---|---|---|---|
| 1 | MN #1 | anchor #1 | prefix #1 | time #1 | current anchor |
| 2 | MN #1 | anchor #3 | prefix #3 | time #2 | |
| 3 | MN #2 | anchor #2 | prefix #2 | time #3 | current anchor |
| 4 | MN #2 | anchor #1 | prefix #1 | time #4 | |
| ... | ... | ... | ... | ... | ... |

When the anchor #2 detects that the MN #1 accesses the IP subnet 2, the anchor #2 sends, to the LM, an information obtaining request that carries the MN #1. Correspondingly, the LM searches for and obtains, from the prestored entries, entries that include the node identifier MN #1, for example, the entries 1 and 2 in Table-1. The LM sends the foregoing entries 1 and 2 to the anchor #2. Correspondingly, the anchor #2 can obtain, from the received entries, valid IP address prefixes being used by the MN #1, that is, the prefix #1 and the prefix #3.

Further, the anchor #2 may differentiate, according to the network identifier corresponding to each valid IP address prefix, between an IP address prefix allocated to the MN #1 by the anchor #2 and an IP address prefix allocated to the MN #1 by another IP address anchor. The prefix #1 and the prefix #3 are not IP address prefixes allocated to the MN #1 by the anchor #2.

Further, the entries stored in the LM further include the preset identifier current anchor. After receiving the foregoing entries 1 and 2 sent by the LM, the anchor #2 finds, by detection, that the prefix #1 allocated by the anchor #1 has the corresponding preset identifier current anchor. It indicates that the MN #1 moves from the IP subnet 1 on which the anchor #1 is located to the IP subnet 2 on which the anchor #2 is located, and an IP subnet accessed by the MN #1 has changed.

In addition, after allocating the IP address prefix to the MN, the IP address anchor sends an information storage request to the LM. The information storage request carries the node identifier of the MN, the network identifier corresponding to the IP address anchor, the IP address prefix allocated by the IP address anchor, and a validity period of the IP address prefix allocated by the IP address anchor, so that the LM stores a target entry according to the information storage request, correspondingly sets the preset identifier in the target entry, and removes the preset identifier from an entry that records the IP address prefix allocated to the MN by the IP subnet that is accessed by the MN before the MN accesses the IP subnet on which the IP address anchor is located. The target entry includes a correspondence among the node identifier of the MN, the network identifier corresponding to the IP address anchor, the IP address prefix allocated by the IP address anchor, and the validity period of the IP address prefix allocated by the IP address anchor.

For example, after receiving the foregoing entries 1 and 2 sent by the LM, the anchor #2 finds, by detection, that the valid IP address prefix being used by the MN #1 does not include the IP address prefix allocated by the anchor #2; then, the anchor #2 allocates an IP address prefix to the MN #1, where the IP address prefix is marked as the prefix #2. In addition, the anchor #2 sets a validity period corresponding to the prefix #2, where the validity period is marked as the time #5. Then, the anchor #2 sends an information storage request to the LM. The information storage request carries the node identifier MN #1, the network identifier anchor #2, the IP address prefix #2, and the validity period time #5. Correspondingly, after receiving the information storage request sent by the anchor #2, the LM updates the prestored entries. Updated entries may be described in the following Table-2:

TABLE 2

| Entry number | Node identifier | Network identifier | IP address prefix | Validity period | Status |
|---|---|---|---|---|---|
| 1 | MN #1 | anchor #2 | prefix #2 | time #5 | current anchor |
| 2 | MN #1 | anchor #1 | prefix #1 | time #1 | |
| 3 | MN #1 | anchor #3 | prefix #3 | time #2 | |
| 4 | MN #2 | anchor #2 | prefix #2 | time #3 | current anchor |
| 5 | MN #2 | anchor #1 | prefix #1 | time #4 | |
| ... | ... | ... | ... | ... | ... |

The anchor #2 stores the entry 1 in Table-2, correspondingly sets the preset identifier current anchor in the entry, and removes the preset identifier current anchor from the entry 2 in Table-2 (that is, the entry 1 in Table-1).

It needs to be further supplemented that an embodiment of the present invention further provides a mechanism for maintaining the entries stored in the LM. The mechanism is specifically as follows: The IP address anchor detects whether the valid IP address prefix includes a target IP address prefix, where the target IP address prefix is an IP address prefix that has not been used by a network session after preset duration elapses; and if the valid IP address prefix includes the target IP address prefix, the IP address anchor sends, to the LM, an entry deletion instruction that carries the node identifier of the MN and the target IP address prefix, so that the LM deletes an entry that records a correspondence between the node identifier of the MN and the target IP address prefix.

For example, when the anchor #2 finds, by detection, that the prefix #3 has not been used by a network session after preset duration elapses, it indicates that the MN #1 no longer needs to use the prefix #3, and the anchor #2 sends, to the LM, an entry deletion instruction that carries the MN #1 and the prefix #3. Correspondingly, after receiving the entry deletion instruction sent by the anchor #2, the LM deletes the entry 3 in Table-2.

In this embodiment of the present invention, by using the foregoing maintenance mechanism, in an aspect, accuracy and real-time performance of the entries stored in the LM can be ensured; in another aspect, a storage resource of the LM can be saved.

It needs to be further supplemented that, with reference to the implementation environment shown in FIG. 1, a mobility management (MM for short) entity may be deployed on each IP subnet. The MM entity is configured to be responsible for executing signaling interaction that is related to mobility management and that is between the IP address anchor and the LM. The MM entity may be deployed as an independent entity, or the MM entity may be integrated together with the IP address anchor.

For example, a process of querying for and obtaining, by the IP address anchor from the LM, the valid IP address prefix being used by the MN is as follows.

1. The IP address anchor sends, to the MM entity, an information obtaining request that carries the node identifier of the MN.

2. The MM entity forwards the information obtaining request to the LM.

3. The LM searches for and obtains, from the prestored entry according to the node identifier of the MN, the valid IP address prefix being used by the MN and the network identifier corresponding to each valid IP address prefix.

4. The LM sends, to the MM entity, the valid IP address prefix and the network identifier corresponding to each valid IP address prefix.

5. The MM entity forwards, to the IP address anchor, the valid IP address prefix and the network identifier corresponding to each valid IP address prefix.

The following describes selection of different types of IP address prefixes when the MN performs a network session.

As described in the embodiments shown in FIG. 4 and FIG. 5A, when providing the MN with the currently available IP address prefix, the IP address anchor differentially identifies, by using the type identifier, the IP address prefix allocated by the IP address anchor and the IP address prefix allocated by the another IP address anchor The MN may differentiate, based on the type identifier, between the foregoing two different types of IP address prefixes. The following describes selection of different types of IP address prefixes for a new network session and an existing network session.

First: A New Network Session

When the MN needs to initiate a new network session to a CN, the MN selects and uses a preferential IP address as a source IP address for the new network session. The preferential IP address is an IP address generated according to the IP address prefix allocated by the IP address anchor on the currently accessed IP subnet and a host address of the MN.

For example, with reference to FIG. 1, the MN moves from the IP subnet 1 to the IP subnet 2, and the RA message sent by the anchor #2 on the IP subnet 2 to the MN includes the prefix #1 and the prefix #2. A second type identifier F-prefix is correspondingly set for the prefix #1, and a first type identifier H-prefix is correspondingly set for the prefix #2. It is assumed that an IP address generated by the MN according to the prefix #1 and the host address of the MN is an IP address #1, and an IP address generated according to the prefix #2 and the host address of the MN is an IP address #2. For the new network session, the MN selects and uses the IP address #2 as a source IP address for the new network session to communicate with the CN, so as to achieve an objective of reducing route redundancy.

Second: An Existing Network Session

The MN determines whether a preferential IP address can be used as a source IP address for an existing network session with a CN. The preferential IP address is an IP address generated according to the IP address prefix allocated by the IP address anchor on the currently accessed IP subnet and a host address of the MN. If the preferential IP address can be used as the source IP address for the existing network session, the MN selects and uses the preferential IP address as the source IP address for the existing network session; on the contrary, if the preferential IP address cannot be used as the source IP address for the existing network session, the MN keeps a source IP address used for the existing network session unchanged.

Still using the foregoing assumption as an example, for the existing network session, before the MN moves to the IP subnet 2, that is, when the MN accesses the IP subnet 1, the IP address #1 is used as the source IP address for the existing network session to communicate with the CN. After the MN moves to the IP subnet 2, the MN determines whether an IP address change can be handled for the existing network session, that is, determines whether the IP address #2 can be used as the source IP address for the existing network session to communicate with the CN. If an IP address change can be handled for the existing network session, the MN selects and uses the IP address #2 as the source IP address for the existing network session to communicate with the CN, so as to achieve an objective of reducing route redundancy. If an IP address change cannot be handled for the existing network session, the MN keeps the source IP address IP address #1 used by the existing network session unchanged, and provides, by using a tunnel (English: tunnel) between the anchor #2 and the anchor #1, continuous support for a service flow of the existing network session, to ensure that the existing network session is not affected.

In addition, the MN may determine, in multiple manners, whether the preferential IP address can be used as the source IP address for the existing network session with the CN.

In a possible implementation, the MN obtains configuration information of an application program corresponding to the existing network session, and determines, according to the configuration information, whether the preferential IP address can be used as the source IP address for the existing network session. For example, when developing the application program, an application program developer performs explicit setting by setting a socket option.

In a second possible implementation, the MN obtains a transport layer protocol used by an application program corresponding to the existing network session, and determines, according to the transport layer protocol, whether the preferential IP address can be used as the source IP address for the existing network session. For another example, because MPTCP (English: Multipath TCP) can handle an IP address change, if the transport layer protocol used by the existing network session is MPTCP, the preferential IP address is used as the source IP address for the existing network session.

In addition, if the MN cannot learn whether the preferential IP address can be used as the source IP address for the existing network session, the MN keeps the source IP address used by the existing network session unchanged.

To sum up, when providing the MN with the currently available IP address prefix, the IP address anchor differentially identifies, by using the type identifier, the IP address prefix allocated by the IP address anchor and the IP address prefix allocated by the another IP address anchor, so that the MN may differentiate, based on the type identifier, between the foregoing two different types of IP address prefixes.

Further, the MN selects and uses the preferential IP address as the source IP address for the new network session and the existing network session for which an IP address change can be handled, thereby achieving the technical effect of reducing route redundancy.

Optionally, when the MN determines that the accessed IP subnet has changed, the MN may query for and obtain an IP address of a CN that is closest to the MN, and establishes a network session with the closest CN according to the IP address, so as to achieve an objective of further reducing the route redundancy.

The following are apparatus embodiments of the present invention. An apparatus in the apparatus embodiments may be configured to execute the method embodiments of the present invention. For details not disclosed in the apparatus embodiments of the present invention, refer to the method embodiments of the present invention.

Figure 6:
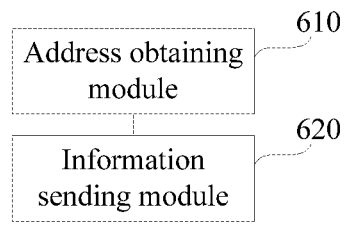
FIG. 6 is a block diagram of an IP address management apparatus according to an embodiment of the present invention.

Referring to FIG. 6, FIG. 6 is a block diagram of an IP address management apparatus according to an embodiment of the present invention. The IP address management apparatus may be applied to an IP address anchor. The IP address management apparatus may include an address obtaining module 610 and an information sending module 620.

The address obtaining module 610 is configured to: when it is detected that a mobile node MN accesses an IP subnet on which the IP address anchor is located, obtain a valid IP address prefix being used by the MN.

The information sending module 620 is configured to send switchover indication information to the MN according to the valid IP address prefix, so that the MN determines, according to the switchover indication information, whether the accessed IP subnet has changed.

To sum up, according to the IP address management apparatus provided in this embodiment, when detecting that the MN accesses the IP subnet on which the IP address anchor is located, the IP address anchor sends the switchover indication information to the MN according to the valid IP address prefix being used by the MN. This resolves a prior-art problem that an MN cannot determine whether an IP subnet accessed by the MN has changed, thereby achieving a technical effect that an MN can accurately determine whether an IP subnet accessed by the MN has changed.

Figure 7:
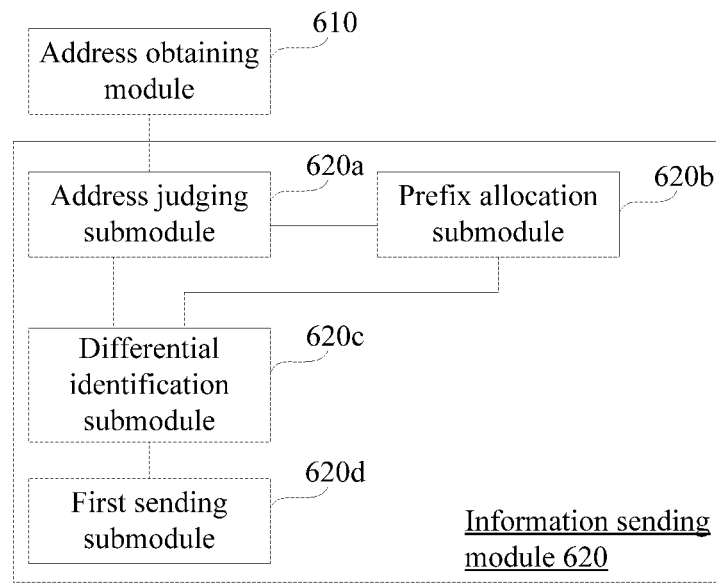
FIG. 7 is a block diagram of an IP address management apparatus according to another embodiment of the present invention.

Referring to FIG. 7, FIG. 7 is a block diagram of an IP address management apparatus according to another embodiment of the present invention. The IP address management apparatus may be applied to an IP address anchor. The IP address management apparatus may include an address obtaining module 610 and an information sending module 620.

The address obtaining module 610 is configured to: when it is detected that a mobile node MN accesses an IP subnet on which the IP address anchor is located, obtain a valid IP address prefix being used by the MN.

The information sending module 620 is configured to send switchover indication information to the MN according to the valid IP address prefix, so that the MN determines, according to the switchover indication information, whether the accessed IP subnet has changed.

In this embodiment, the information sending module 620 includes an address judging submodule 620a, a prefix allocation submodule 620b, a differential identification submodule 620c, and a first sending submodule 620d.

The address judging submodule 620a is configured to determine whether the valid IP address prefix already includes an IP address prefix allocated by the IP address anchor.

The prefix allocation submodule 620b is configured to allocate an IP address prefix to the MN when the valid IP address prefix does not include an IP address prefix allocated by the IP address anchor.

The differential identification submodule 620c is configured to differentially identify the IP address prefix allocated by the IP address anchor and an IP address prefix that is in the valid IP address prefix and that is allocated by another IP address anchor.

The first sending submodule 620d is configured to send the switchover indication information to the MN, where the switchover indication information includes the IP address prefix allocated by the IP address anchor, the IP address prefix allocated by the another IP address anchor, and a type identifier, where the type identifier is used to differentially identify the IP address prefix allocated by the IP address anchor and the IP address prefix allocated by the another IP address anchor.

To sum up, according to the IP address management apparatus provided in this embodiment, when detecting that the MN accesses the IP subnet on which the IP address anchor is located, the IP address anchor sends the switchover indication information to the MN according to the valid IP address prefix being used by the MN. This resolves a prior-art problem that an MN cannot determine whether an IP subnet accessed by the MN has changed, thereby achieving a technical effect that an MN can accurately determine whether an IP subnet accessed by the MN has changed.

Figure 8:
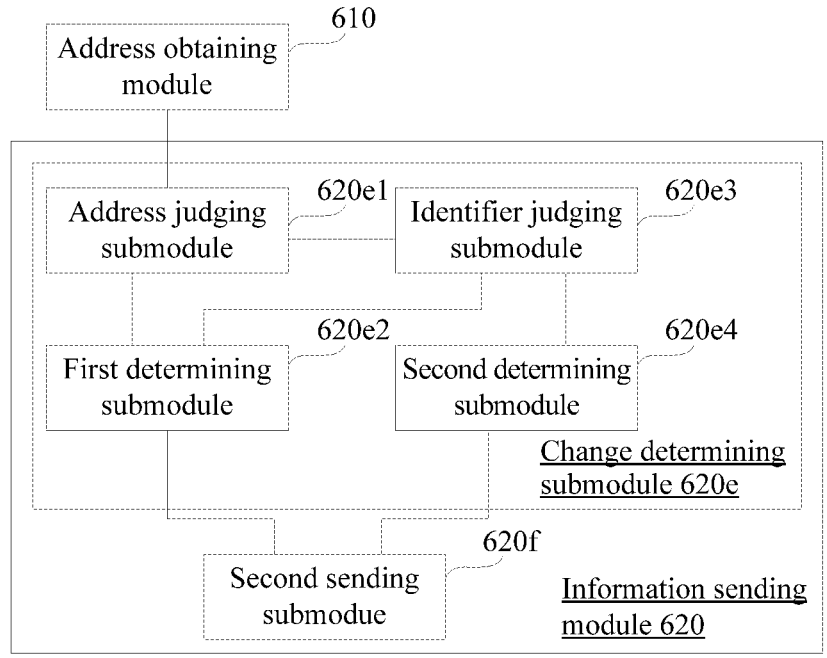
FIG. 8 is a block diagram of an IP address management apparatus according to another embodiment of the present invention.

Referring to FIG. 8, FIG. 8 is a block diagram of an IP address management apparatus according to another embodiment of the present invention. The IP address management apparatus may be applied to an IP address anchor. The IP address management apparatus may include an address obtaining module 610 and an information sending module 620.

The address obtaining module 610 is configured to: when it is detected that a mobile node MN accesses an IP subnet on which the IP address anchor is located, obtain a valid IP address prefix being used by the MN.

The information sending module 620 is configured to send switchover indication information to the MN according to the valid IP address prefix, so that the MN determines, according to the switchover indication information, whether the accessed IP subnet has changed.

In this embodiment, the information sending module 620 includes a change determining submodule 620e and a second sending submodule 620f.

The change determining submodule 620e is configured to determine, according to the valid IP address prefix, whether the IP subnet accessed by the MN has changed.

The second sending submodule 620f is configured to send the switchover indication information to the MN according to a determining result, where the switchover indication information includes a first indicator or a second indicator.

The first indicator is used to indicate that the IP subnet accessed by the MN has changed, and the second indicator is used to indicate that the IP subnet accessed by the MN has not changed.

Optionally, the change determining submodule 620e includes an address judging submodule 620e1, a first determining submodule 620e2, an identifier judging submodule 620e3, and a second determining submodule 620e4.

The address judging submodule 620e1 is configured to determine whether the valid IP address prefix already includes an IP address prefix allocated by the IP address anchor.

The first determining submodule 620e2 is configured to: when the valid IP address prefix does not include an IP address prefix allocated by the IP address anchor, determine that the IP subnet accessed by the MN has changed.

The identifier judging submodule 620e3 is configured to: when the valid IP address prefix already includes an IP address prefix allocated by the IP address anchor, determine whether the IP address prefix allocated by the IP address anchor has a corresponding preset identifier, where the preset identifier is corresponding to an IP address prefix allocated to the MN by an IP subnet that is accessed by the MN before the MN accesses the IP subnet on which the IP address anchor is located.

The second determining submodule 620e4 is configured to: when the IP address prefix allocated by the IP address anchor has the corresponding preset identifier, determine that the IP subnet accessed by the MN has not changed.

The first determining submodule 620e2 is further configured to: when the IP address prefix allocated by the IP address anchor does not have the corresponding preset identifier, determine that the IP subnet accessed by the MN has changed.

Optionally, the apparatus further includes a prefix allocation submodule, a differential identification submodule, and a message sending submodule (not shown in the figure).

The prefix allocation submodule is configured to allocate an IP address prefix to the MN when the valid IP address prefix does not include an IP address prefix allocated by the IP address anchor.

The differential identification submodule is configured to differentially identify the IP address prefix allocated by the IP address anchor and an IP address prefix that is in the valid IP address prefix and that is allocated by another IP address anchor.

The message sending submodule is configured to send a router advertisement message to the MN, where the router advertisement message includes the IP address prefix allocated by the IP address anchor, the IP address prefix allocated by the another IP address anchor, and a type identifier, where the type identifier is used to differentially identify the IP address prefix allocated by the IP address anchor and the IP address prefix allocated by the another IP address anchor.

To sum up, according to the IP address management apparatus provided in this embodiment, when detecting that the MN accesses the IP subnet on which the IP address anchor is located, the IP address anchor sends the switchover indication information to the MN according to the valid IP address prefix being used by the MN. This resolves a prior-art problem that an MN cannot determine whether an IP subnet accessed by the MN has changed, thereby achieving a technical effect that an MN can accurately determine whether an IP subnet accessed by the MN has changed.

With reference to the embodiments shown in FIG. 7 and FIG. 8, in a possible implementation, the differential identification submodule is specifically configured to: correspondingly set a first type identifier for the IP address prefix allocated by the IP address anchor, and/or correspondingly set a second type identifier for the IP address prefix allocated by the another IP address anchor.

Figure 9:
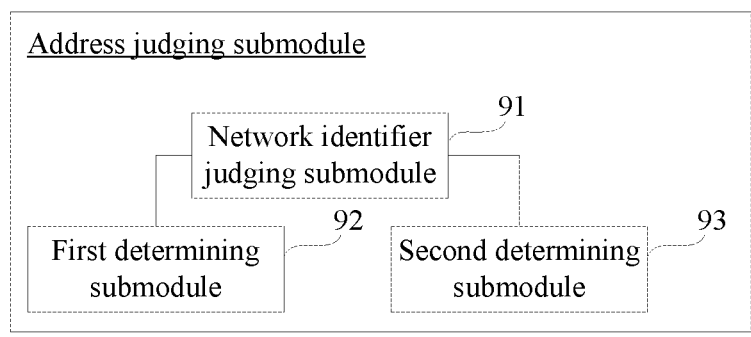
FIG. 9 is a block diagram of an address judging submodule according to an embodiment of the present invention.

With reference to the embodiments shown in FIG. 7 and FIG. 8, in a possible implementation, as shown in FIG. 9, the address judging submodule includes a network identifier judging submodule 91, a first determining submodule 92, and a second determining submodule 93.

The network identifier judging submodule 91 is configured to determine whether a network identifier corresponding to each valid IP address prefix includes a network identifier corresponding to the IP address anchor, where the network identifier is an anchor identifier or a network code.

The first determining submodule 92 is configured to: when the network identifier corresponding to the IP address anchor exists, determine that the valid IP address prefix already includes an IP address prefix allocated by the IP address anchor.

The second determining submodule 93 is configured to: when the network identifier corresponding to the IP address anchor does not exist, determine that the valid IP address prefix does not include an IP address prefix allocated by the IP address anchor.

Optionally, the address obtaining module includes a request obtaining submodule and an address receiving submodule (not shown in the figure).

The request obtaining submodule is configured to send, to a location manager LM, an information obtaining request that carries a node identifier of the MN, so that the LM searches for and obtains, from a prestored entry according to the node identifier of the MN, the valid IP address prefix being used by the MN and the network identifier corresponding to each valid IP address prefix, where each entry includes a correspondence among a node identifier, a network identifier, an IP address prefix, and a validity period of the IP address prefix, and the IP address prefix allocated to the MN by the IP subnet that is accessed by the MN before the MN accesses the IP subnet on which the IP address anchor is located further has the corresponding preset identifier.

The address receiving submodule is configured to receive the valid IP address prefix and the network identifier corresponding to each valid IP address prefix, where the valid IP address prefix and the network identifier are fed back by the LM.

Optionally, the apparatus further includes a request storage submodule (not shown in the figure).

The request storage submodule is configured to send an information storage request to the LM, where the information storage request carries the node identifier of the MN, the network identifier corresponding to the IP address anchor, the IP address prefix allocated by the IP address anchor, and a validity period of the IP address prefix allocated by the IP address anchor, so that the LM stores a target entry according to the information storage request, correspondingly sets the preset identifier in the target entry, and removes the preset identifier from an entry that records the IP address prefix allocated to the MN by the IP subnet that is accessed by the MN before the MN accesses the IP subnet on which the IP address anchor is located.

The target entry includes a correspondence among the node identifier of the MN, the network identifier corresponding to the IP address anchor, the IP address prefix allocated by the IP address anchor, and the validity period of the IP address prefix allocated by the IP address anchor.

Optionally, the apparatus further includes an address detection submodule and an instruction sending submodule (not shown in the figure).

The address detection submodule is configured to detect whether the valid IP address prefix includes a target IP address prefix, where the target IP address prefix is an IP address prefix that has not been used by a network session after preset duration elapses.

The instruction sending submodule is configured to: when the valid IP address prefix includes the target IP address prefix, send, to the LM, an entry deletion instruction that carries the node identifier of the MN and the target IP address prefix, so that the LM deletes an entry that records a correspondence between the node identifier of the MN and the target IP address prefix.

Figure 10:
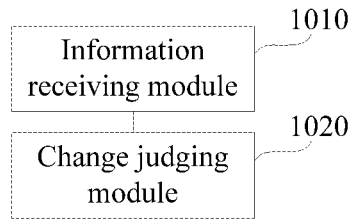
FIG. 10 is a block diagram of an IP address management apparatus according to another embodiment of the present invention.

Referring to FIG. 10, FIG. 10 is a block diagram of an IP address management apparatus according to another embodiment of the present invention. The IP address management apparatus may be applied to an MN. The IP address management apparatus may include an information receiving module 1010 and a change judging module 1020.

The information receiving module 1010 is configured to: after an IP subnet on which an IP address anchor is located is accessed, receive switchover indication information sent by the IP address anchor.

The change judging module 1020 is configured to determine, according to the switchover indication information, whether the accessed IP subnet has changed.

To sum up, according to the IP address management apparatus provided in this embodiment, the MN receives the switchover indication information sent by the IP address anchor, and determines, according to the switchover indication information, whether the accessed IP subnet has changed. This resolves a prior-art problem that an MN cannot determine whether an IP subnet accessed by the MN has changed, thereby achieving a technical effect that an MN can accurately determine whether an IP subnet accessed by the MN has changed.

Figure 11:
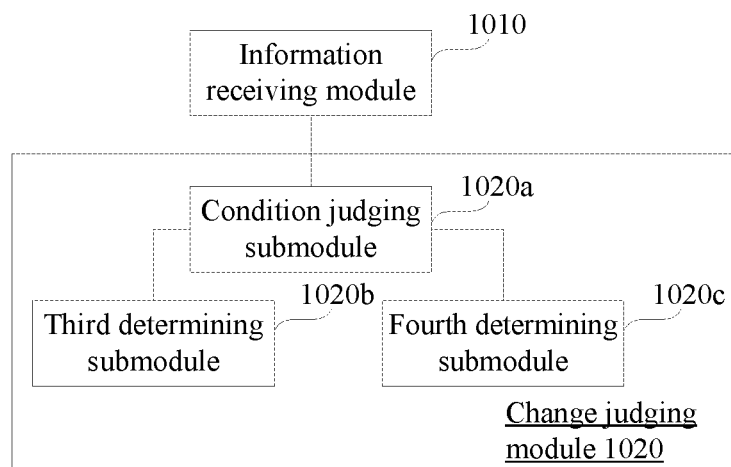
FIG. 11 is a block diagram of an IP address management apparatus according to another embodiment of the present invention.

Referring to FIG. 11, FIG. 11 is a block diagram of an IP address management apparatus according to another embodiment of the present invention. The IP address management apparatus may be applied to an MN. The IP address management apparatus may include an information receiving module 1010 and a change judging module 1020.

The information receiving module 1010 is configured to: after an IP subnet on which an IP address anchor is located is accessed, receive switchover indication information sent by the IP address anchor.

The change judging module 1020 is configured to determine, according to the switchover indication information, whether the accessed IP subnet has changed.

In this embodiment, the switchover indication information includes an IP address prefix allocated by the IP address anchor, an IP address prefix allocated by another IP address anchor, and a type identifier, where the type identifier is used to differentially identify the IP address prefix allocated by the IP address anchor and the IP address prefix allocated by the another IP address anchor.

Correspondingly, the change judging module 1020 includes a condition judging submodule 1020a, a third determining submodule 1020b, and a fourth determining submodule 1020c.

The condition judging submodule 1020a is configured to determine whether the IP address prefix allocated by the IP address anchor meets a preset condition, where the preset condition is: the IP address prefix allocated by the IP address anchor does not exist in previous switchover indication information received by the MN, or the IP address prefix allocated by the IP address anchor exists in previous switchover indication information received by the MN and is identified as being allocated by the another IP address anchor.

The third determining submodule 1020b is configured to: when the IP address prefix allocated by the IP address anchor meets the preset condition, determine that the accessed IP subnet has changed.

The fourth determining submodule 1020c is configured to: when the IP address prefix allocated by the IP address anchor does not meet the preset condition, determine that the accessed IP subnet has not changed.

To sum up, according to the IP address management apparatus provided in this embodiment, the MN receives the switchover indication information sent by the IP address anchor, and determines, according to the switchover indication information, whether the accessed IP subnet has changed. This resolves a prior-art problem that an MN cannot determine whether an IP subnet accessed by the MN has changed, thereby achieving a technical effect that an MN can accurately determine whether an IP subnet accessed by the MN has changed.

Figure 12:
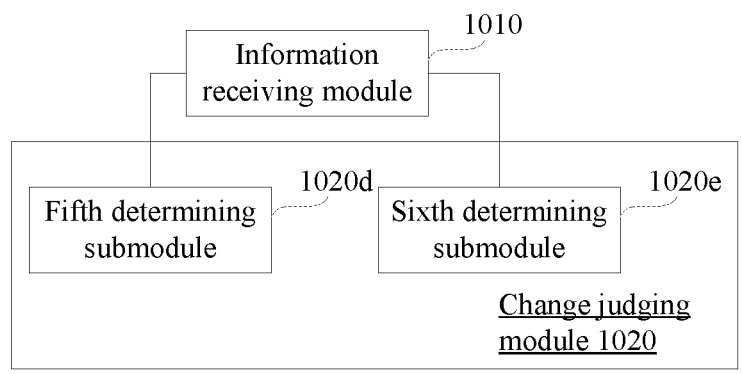
FIG. 12 is a block diagram of an IP address management apparatus according to another embodiment of the present invention.

Referring to FIG. 12, FIG. 12 is a block diagram of an IP address management apparatus according to another embodiment of the present invention. The IP address management apparatus may be applied to an MN. The IP address management apparatus may include an information receiving module 1010 and a change judging module 1020.

The information receiving module 1010 is configured to: after an IP subnet on which an IP address anchor is located is accessed, receive switchover indication information sent by the IP address anchor.

The change judging module 1020 is configured to determine, according to the switchover indication information, whether the accessed IP subnet has changed.

In this embodiment, the switchover indication information includes a first indicator or a second indicator, where the first indicator is used to indicate that the IP subnet accessed by the MN has changed, and the second indicator is used to indicate that the IP subnet accessed by the MN has not changed.

The change judging module 1020 includes a fifth determining submodule 1020d and a sixth determining submodule 1020e.

The fifth determining submodule 1020d is configured to: when the switchover indication information includes the first indicator, determine that the accessed IP subnet has changed.

The sixth determining submodule 1020e is configured to: when the switchover indication information includes the second indicator, determine that the accessed IP subnet has not changed.

Optionally, the apparatus further includes a message receiving submodule (not shown in the figure).

The message receiving submodule is configured to receive a router advertisement message sent by the IP address anchor.

The router advertisement message includes an IP address prefix allocated by the IP address anchor, an IP address prefix allocated by another IP address anchor, and a type identifier, where the type identifier is used to differentially identify the IP address prefix allocated by the IP address anchor and the IP address prefix allocated by the another IP address anchor.

To sum up, according to the IP address management apparatus provided in this embodiment, the MN receives the switchover indication information sent by the IP address anchor, and determines, according to the switchover indication information, whether the accessed IP subnet has changed. This resolves a prior-art problem that an MN cannot determine whether an IP subnet accessed by the MN has changed, thereby achieving a technical effect that an MN can accurately determine whether an IP subnet accessed by the MN has changed.

With reference to the embodiments shown in FIG. 11 and FIG. 12, in a possible implementation, the type identifier includes a first type identifier and/or a second type identifier.

The first type identifier is correspondingly set for the IP address prefix allocated by the IP address anchor.

The second type identifier is correspondingly set for the IP address prefix allocated by the another IP address anchor.

Figure 13:
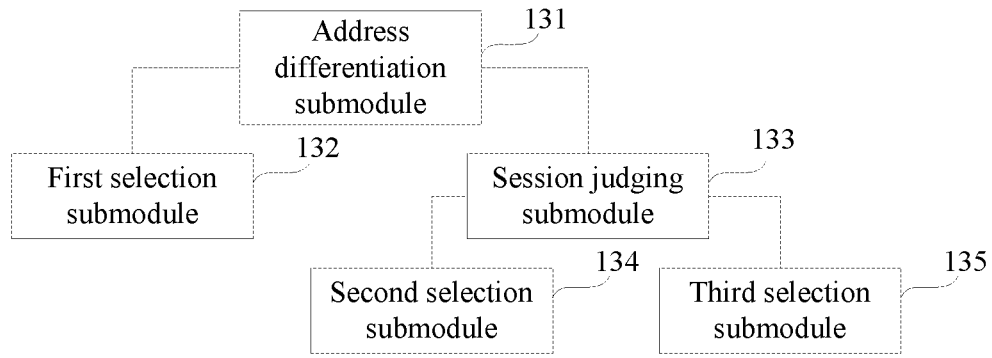
FIG. 13 is a block diagram of another IP address management apparatus according to the embodiments shown in FIG. 11 and FIG. 12.

With reference to the embodiments shown in FIG. 11 and FIG. 12, in a possible implementation, as shown in FIG. 13, the apparatus further includes an address differentiation submodule 131.

The address differentiation submodule 131 is configured to differentiate, according to the type identifier, between the IP address prefix allocated by the IP address anchor and the IP address prefix allocated by the another IP address anchor.

Optionally, the apparatus further includes a first selection submodule 132.

The first selection submodule 132 is configured to: when the MN needs to initiate a new network session to a correspondent node CN, select and use a preferential IP address as a source IP address for the new network session.

The preferential IP address is an IP address generated according to the IP address prefix allocated by the IP address anchor and a host address of the MN.

Optionally, the apparatus further includes a session judging submodule 133, a second selection submodule 134, and a third selection submodule 135.

The session judging submodule 133 is configured to determine whether a preferential IP address can be used as a source IP address for an existing network session with a correspondent node CN, where the preferential IP address is an IP address generated according to the IP address prefix allocated by the IP address anchor and a host address of the MN.

The second selection submodule 134 is configured to: when the preferential IP address can be used as the source IP address for the existing network session, select and use the preferential IP address as the source IP address for the existing network session.

The third selection submodule 135 is configured to: when the preferential IP address cannot be used as the source IP address for the existing network session, keep a source IP address used for the existing network session unchanged.

Optionally, the session judging submodule 133 is specifically configured to:

obtain configuration information of an application program corresponding to the existing network session, and determine, according to the configuration information, whether the preferential IP address can be used as the source IP address for the existing network session; or obtain a transport layer protocol used by an application program corresponding to the existing network session, and determine, according to the transport layer protocol, whether the preferential IP address can be used as the source IP address for the existing network session.

With reference to the embodiment shown in FIG. 10, FIG. 11, or FIG. 12, in a possible implementation, the apparatus further includes an address query module and a session establishment module (not shown in the figure).

The address query module is configured to: when the MN determines that the accessed IP subnet has changed, query for and obtain an IP address of a correspondent node CN that is closest to the MN.

The session establishment module is configured to establish a network session with the closest CN according to the IP address.

It should be noted that, when the IP address management apparatus provided in the foregoing embodiments performs IP address management, division of the foregoing functional modules is merely used as an example for description. In actual application, the foregoing functions may be completed by different functional modules as required, that is, an internal structure of a device is divided into different functional modules to implement all or some of the functions described above. In addition, the IP address management apparatus provided in the foregoing embodiments and the method embodiments of the IP address management method belong to a same idea. For details about a specific implementation process of the IP address management apparatus, refer to the method embodiments. Details are not described herein again.

Figure 14:
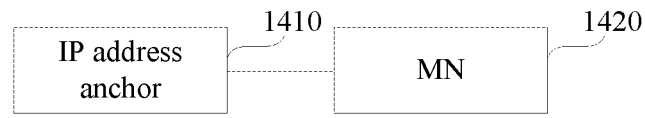
FIG. 14 is a block diagram of an IP address management system according to an embodiment of the present invention.

Referring to FIG. 14, FIG. 14 is a block diagram of an IP address management system according to an embodiment of the present invention. The IP address management system includes an IP address anchor 1410 and an MN 1420.

The IP address anchor 1410 may include the IP address management apparatus provided in the embodiment shown in FIG. 6, FIG. 7, or FIG. 8.

The MN 1420 may include the IP address management apparatus provided in the embodiment shown in FIG. 10, FIG. 11, or FIG. 12.

Figure 15:
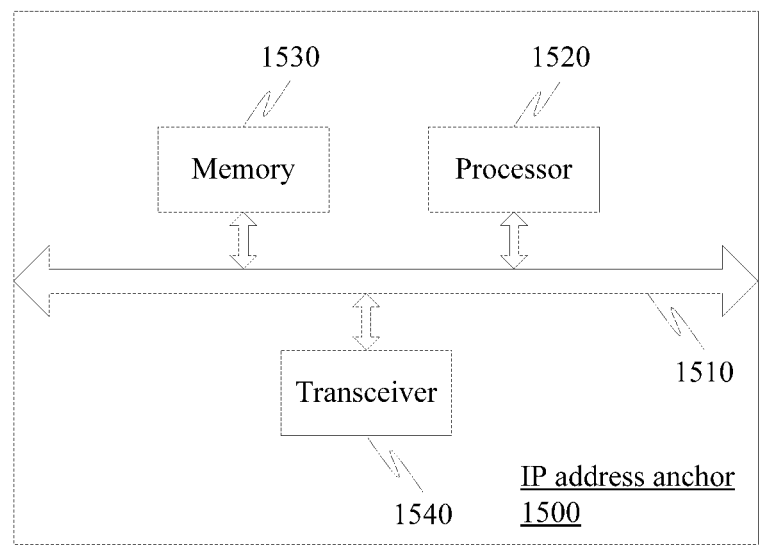
FIG. 15 is a structural block diagram of an IP address anchor according to an embodiment of the present invention.

Referring to FIG. 15, FIG. 15 is a structural block diagram of an IP address anchor according to an embodiment of the present invention. As shown in FIG. 15, the IP address anchor 1500 includes a bus 1510, and a processor 1520, a memory 1530, and a transceiver 1540 that communicate with one another by using the bus 1510. The memory 1530 is configured to store one or more instructions, where the instruction is configured to be executed by the processor 1520.

The processor 1520 is configured to: when it is detected that a mobile node MN accesses an IP subnet on which the IP address anchor is located, obtain a valid IP address prefix being used by the MN.

The processor 1520 is further configured to control, according to the valid IP address prefix, the transceiver 1540 to send switchover indication information to the MN, so that the MN determines, according to the switchover indication information, whether the accessed IP subnet has changed.

To sum up, when detecting that the MN accesses the IP subnet on which the IP address anchor provided in this embodiment is located, the IP address anchor sends the switchover indication information to the MN according to the valid IP address prefix being used by the MN. This resolves a prior-art problem that an MN cannot determine whether an IP subnet accessed by the MN has changed, thereby achieving a technical effect that an MN can accurately determine whether an IP subnet accessed by the MN has changed.

In an optional embodiment provided based on the embodiment shown in FIG. 15, the processor 1520 is specifically configured to:

determine whether the valid IP address prefix already includes an IP address prefix allocated by the IP address anchor;

if the valid IP address prefix does not include an IP address prefix allocated by the IP address anchor, allocate an IP address prefix to the MN, and differentially identify the IP address prefix allocated by the IP address anchor and an IP address prefix that is in the valid IP address prefix and that is allocated by another IP address anchor; or if the valid IP address prefix already includes an IP address prefix allocated by the IP address anchor, differentially identify the IP address prefix allocated by the IP address anchor and an IP address prefix that is in the valid IP address prefix and that is allocated by another IP address anchor; and control the transceiver 1540 to send the switchover indication information to the MN, where the switchover indication information includes the IP address prefix allocated by the IP address anchor, the IP address prefix allocated by the another IP address anchor, and a type identifier, where the type identifier is used to differentially identify the IP address prefix allocated by the IP address anchor and the IP address prefix allocated by the another IP address anchor.

In an optional embodiment provided based on the embodiment shown in FIG. 15, the processor 1520 is specifically configured to:

determine, according to the valid IP address prefix, whether the IP subnet accessed by the MN has changed; and control, according to a determining result, the transceiver 1540 to send the switchover indication information to the MN, where the switchover indication information includes a first indicator or a second indicator.

The first indicator is used to indicate that the IP subnet accessed by the MN has changed, and the second indicator is used to indicate that the IP subnet accessed by the MN has not changed.

In an optional embodiment provided based on the embodiment shown in FIG. 15, the processor 1520 is specifically configured to:

determine whether the valid IP address prefix already includes an IP address prefix allocated by the IP address anchor;

if the valid IP address prefix does not include an IP address prefix allocated by the IP address anchor, determine that the IP subnet accessed by the MN has changed; or if the valid IP address prefix already includes an IP address prefix allocated by the IP address anchor, determine whether the IP address prefix allocated by the IP address anchor has a corresponding preset identifier, where the preset identifier is corresponding to an IP address prefix allocated to the MN by an IP subnet that is accessed by the MN before the MN accesses the IP subnet on which the IP address anchor is located; and if the IP address prefix allocated by the IP address anchor has the corresponding preset identifier, determine that the IP subnet accessed by the MN has not changed; or if the IP address prefix allocated by the IP address anchor does not have the corresponding preset identifier, determine that the IP subnet accessed by the MN has changed.

In an optional embodiment provided based on the embodiment shown in FIG. 15, the processor 1520 is further configured to: if the valid IP address prefix does not include an IP address prefix allocated by the IP address anchor, allocate an IP address prefix to the MN, and differentially identify the IP address prefix allocated by the IP address anchor and an IP address prefix that is in the valid IP address prefix and that is allocated by another IP address anchor.

The processor 1520 is further configured to: if the valid IP address prefix already includes an IP address prefix allocated by the IP address anchor, differentially identify the IP address prefix allocated by the IP address anchor and an IP address prefix that is in the valid IP address prefix and that is allocated by another IP address anchor.

The processor 1520 is further configured to control the transceiver 1540 to send a router advertisement message to the MN, where the router advertisement message includes the IP address prefix allocated by the IP address anchor, the IP address prefix allocated by the another IP address anchor, and a type identifier, where the type identifier is used to differentially identify the IP address prefix allocated by the IP address anchor and the IP address prefix allocated by the another IP address anchor.

In an optional embodiment provided based on the embodiment shown in FIG. 15, the processor 1520 is specifically configured to:

correspondingly set a first type identifier for the IP address prefix allocated by the IP address anchor; and/or correspondingly set a second type identifier for the IP address prefix allocated by the another IP address anchor.

In an optional embodiment provided based on the embodiment shown in FIG. 15, the processor 1520 is specifically configured to:

determine whether a network identifier corresponding to each valid IP address prefix includes a network identifier corresponding to the IP address anchor, where the network identifier is an anchor identifier or a network code; and if the network identifier corresponding to the IP address anchor exists, determine that the valid IP address prefix already includes an IP address prefix allocated by the IP address anchor; or if the network identifier corresponding to the IP address anchor does not exist, determine that the valid IP address prefix does not include an IP address prefix allocated by the IP address anchor.

In an optional embodiment provided based on the embodiment shown in FIG. 15, the processor 1520 is specifically configured to:

control the transceiver 1540 to send, to a location manager LM, an information obtaining request that carries a node identifier of the MN, so that the LM searches for and obtains, from a prestored entry according to the node identifier of the MN, the valid IP address prefix being used by the MN and the network identifier corresponding to each valid IP address prefix, where each entry includes a correspondence among a node identifier, a network identifier, an IP address prefix, and a validity period of the IP address prefix, and the IP address prefix allocated to the MN by the IP subnet that is accessed by the MN before the MN accesses the IP subnet on which the IP address anchor is located further has the corresponding preset identifier; and control the transceiver 1540 to receive the valid IP address prefix and the network identifier corresponding to each valid IP address prefix, where the valid IP address prefix and the network identifier are fed back by the LM.

In an optional embodiment provided based on the embodiment shown in FIG. 15, the processor 1520 is further configured to control the transceiver 1540 to send an information storage request to the LM, where the information storage request carries the node identifier of the MN, the network identifier corresponding to the IP address anchor, the IP address prefix allocated by the IP address anchor, and a validity period of the IP address prefix allocated by the IP address anchor, so that the LM stores a target entry according to the information storage request, correspondingly sets the preset identifier in the target entry, and removes the preset identifier from an entry that records the IP address prefix allocated to the MN by the IP subnet that is accessed by the MN before the MN accesses the IP subnet on which the IP address anchor is located.

The target entry includes a correspondence among the node identifier of the MN, the network identifier corresponding to the IP address anchor, the IP address prefix allocated by the IP address anchor, and the validity period of the IP address prefix allocated by the IP address anchor.

In an optional embodiment provided based on the embodiment shown in FIG. 15, the processor 1520 is further configured to detect whether the valid IP address prefix includes a target IP address prefix, where the target IP address prefix is an IP address prefix that has not been used by a network session after preset duration elapses.

The processor 1520 is further configured to: if the valid IP address prefix includes the target IP address prefix, control the transceiver 1540 to send, to the LM, an entry deletion instruction that carries the node identifier of the MN and the target IP address prefix, so that the LM deletes an entry that records a correspondence between the node identifier of the MN and the target IP address prefix.

Figure 16:
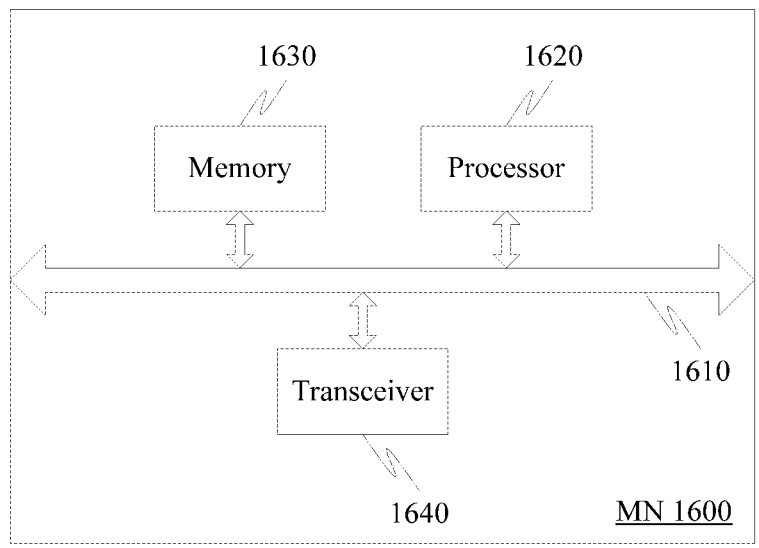
FIG. 16 is a structural block diagram of an MN according to an embodiment of the present invention.

Referring to FIG. 16, FIG. 16 is a structural block diagram of an MN according to an embodiment of the present invention. As shown in FIG. 16, the MN 1600 includes a bus 1610, and a processor 1620, a memory 1630, and a transceiver 1640 that communicate with one another by using the bus 1610. The memory 1630 is configured to store one or more instructions, where the instruction is configured to be executed by the processor 1620.

The processor 1620 is configured to: after an IP subnet on which an IP address anchor is located is accessed, control the transceiver 1640 to receive switchover indication information sent by the IP address anchor.

The processor 1620 is further configured to determine, according to the switchover indication information, whether the accessed IP subnet has changed.

To sum up, the MN provided in this embodiment receives the switchover indication information sent by the IP address anchor, and determines, according to the switchover indication information, whether the accessed IP subnet has changed. This resolves a prior-art problem that an MN cannot determine whether an IP subnet accessed by the MN has changed, thereby achieving a technical effect that an MN can accurately determine whether an IP subnet accessed by the MN has changed.

In an optional embodiment provided based on the embodiment shown in FIG. 16, the switchover indication information includes an IP address prefix allocated by the IP address anchor, an IP address prefix allocated by another IP address anchor, and a type identifier, where the type identifier is used to differentially identify the IP address prefix allocated by the IP address anchor and the IP address prefix allocated by the another IP address anchor.

The processor 1620 is specifically configured to:

determine whether the IP address prefix allocated by the IP address anchor meets a preset condition, where the preset condition is: the IP address prefix allocated by the IP address anchor does not exist in previous switchover indication information received by the MN, or the IP address prefix allocated by the IP address anchor exists in previous switchover indication information received by the MN and is identified as being allocated by the another IP address anchor; and if the IP address prefix allocated by the IP address anchor meets the preset condition, determine that the accessed IP subnet has changed; or if the IP address prefix allocated by the IP address anchor does not meet the preset condition, determine that the accessed IP subnet has not changed.

In an optional embodiment provided based on the embodiment shown in FIG. 16, the switchover indication information includes a first indicator or a second indicator, where the first indicator is used to indicate that the IP subnet accessed by the MN has changed, and the second indicator is used to indicate that the IP subnet accessed by the MN has not changed.

The processor 1620 is specifically configured to:

when the switchover indication information includes the first indicator, determine that the accessed IP subnet has changed; or when the switchover indication information includes the second indicator, determine that the accessed IP subnet has not changed.

In an optional embodiment provided based on the embodiment shown in FIG. 16, the processor 1620 is further configured to control the transceiver 1640 to receive a router advertisement message sent by the IP address anchor.

The router advertisement message includes an IP address prefix allocated by the IP address anchor, an IP address prefix allocated by another IP address anchor, and a type identifier, where the type identifier is used to differentially identify the IP address prefix allocated by the IP address anchor and the IP address prefix allocated by the another IP address anchor.

In an optional embodiment provided based on the embodiment shown in FIG. 16, the type identifier includes a first type identifier and/or a second type identifier.

The first type identifier is correspondingly set for the IP address prefix allocated by the IP address anchor.

The second type identifier is correspondingly set for the IP address prefix allocated by the another IP address anchor.

In an optional embodiment provided based on the embodiment shown in FIG. 16, the processor 1620 is further configured to differentiate, according to the type identifier, between the IP address prefix allocated by the IP address anchor and the IP address prefix allocated by the another IP address anchor.

In an optional embodiment provided based on the embodiment shown in FIG. 16, the processor 1620 is further configured to: when the MN needs to initiate a new network session to a correspondent node CN, select and use a preferential IP address as a source IP address for the new network session.

The preferential IP address is an IP address generated according to the IP address prefix allocated by the IP address anchor and a host address of the MN.

In an optional embodiment provided based on the embodiment shown in FIG. 16, the processor 1620 is further configured to determine whether a preferential IP address can be used as a source IP address for an existing network session with a correspondent node CN, where the preferential IP address is an IP address generated according to the IP address prefix allocated by the IP address anchor and a host address of the MN.

The processor 1620 is further configured to: when the preferential IP address can be used as the source IP address for the existing network session, select and use the preferential IP address as the source IP address for the existing network session.

The processor 1620 is further configured to: when the preferential IP address cannot be used as the source IP address for the existing network session, keep a source IP address used for the existing network session unchanged.

In an optional embodiment provided based on the embodiment shown in FIG. 16, the processor 1620 is specifically configured to:

obtain configuration information of an application program corresponding to the existing network session, and determine, according to the configuration information, whether the preferential IP address can be used as the source IP address for the existing network session; or obtain a transport layer protocol used by an application program corresponding to the existing network session, and determine, according to the transport layer protocol, whether the preferential IP address can be used as the source IP address for the existing network session.

In an optional embodiment provided based on the embodiment shown in FIG. 16, the processor 1620 is further configured to: when the MN determines that the accessed IP subnet has changed, query for and obtain an IP address of a correspondent node CN that is closest to the MN.

The processor 1620 is further configured to establish a network session with the closest CN according to the IP address.

It should be understood that a singular form "a" ("a", "an", or "the") used in this specification aims to also include a plural form, unless an unusual case is explicitly supported in context. It should be further understood that, "and/or" used in this specification means including any or all possible combinations of one or more associated items that are listed.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely example embodiments of the present invention, but are not intended to limit the present invention. Any modification, equivalent replacement, and improvement made without departing from the principle of the present invention shall fall within the protection scope of the present invention.

What is claimed is:

1. An IP address management method, wherein the method comprises:

when detecting that a mobile node (MN) accesses an IP subnet on which an IP address anchor is located, obtaining, by the IP address anchor, a valid IP address prefix being used by the MN; and sending, by the IP address anchor using an information sending module of the IP address anchor, switchover indication information to the MN according to the valid IP address prefix, so that the MN determines, according to the switchover indication information, whether the accessed IP subnet has changed, wherein the sending, by the IP address anchor, switchover indication information to the MN according to the valid IP address prefix comprises:

determining, by the IP address anchor, whether the valid IP address prefix already comprises an IP address prefix allocated by the IP address anchor;

if the valid IP address prefix does not comprise an IP address prefix allocated by the IP address anchor, allocating, by the IP address anchor, an IP address prefix to the MN, and identifying the IP address prefix allocated by the IP address anchor and an IP address prefix that is in the valid IP address prefix and that is allocated by another IP address anchor, or if the valid IP address prefix already comprises an IP address prefix allocated by the IP address anchor, identifying, by the IP address anchor, the IP address prefix allocated by the IP address anchor and an IP address prefix that is in the valid IP address prefix and that is allocated by another IP address anchor; and sending, by the IP address anchor, the switchover indication information to the MN, wherein the switchover indication information comprises the IP address prefix allocated by the IP address anchor, the IP address prefix allocated by the another IP address anchor, and a type identifier, wherein the type identifier is used to identify the IP address prefix allocated by the IP address anchor and the IP address prefix allocated by the another IP address anchor.

2. The method according to claim 1, wherein the sending, by the IP address anchor, switchover indication information to the MN according to the valid IP address prefix further comprises:

determining, by the IP address anchor according to the valid IP address prefix, whether the IP subnet accessed by the MN has changed; and sending, by the IP address anchor, the switchover indication information to the MN according to a determining result, wherein the switchover indication information comprises a first indicator or a second indicator, wherein the first indicator is used to indicate that the IP subnet accessed by the MN has changed, and the second indicator is used to indicate that the IP subnet accessed by the MN has not changed.

3. An IP address management method, wherein the method comprises:

receiving, by a mobile node (MN) after accessing an IP subnet on which an IP address anchor is located, switchover indication information sent by the IP address anchor using an information sending module of the IP address anchor; and determining, by the MN according to the switchover indication information, whether the accessed IP subnet has changed, wherein the switchover indication information comprises an IP address prefix allocated by the IP address anchor, and IP address prefix allocated by another IP address anchor, and a type identifier, wherein the type identifier is used to identify the IP address prefix allocated by the IP address anchor and the IP address prefix allocated by the another IP address anchor; and the determining, by the MN according to the switchover indication information, whether the accessed IP subnet has changed comprises:

determining, by the MN, whether the IP address prefix allocated by the IP address anchor meets a preset condition, wherein the preset condition is: the IP address prefix allocated by the IP address anchor does not exist in previous switchover indication information received by the MN, or the IP address prefix allocated by the IP address anchor exists in previous switchover indication information received by the MN and is identified as being allocated by the another IP address anchor; and if the IP address prefix allocated by the IP address anchor meets the preset condition, determining, by the MN, that the accessed IP subnet has changed; or if the IP address prefix allocated by the IP address anchor does not meet the preset condition, determining, by the MN, that the accessed IP subnet has not changed.

4. The method according to claim 3, wherein the switchover indication information comprises a first indicator or a second indicator, wherein the first indicator is used to indicate that the IP subnet accessed by the MN has changed, and the second indicator is used to indicate that the IP subnet accessed by the MN has not changed; and the determining, by the MN according to the switchover indication information, whether the accessed IP subnet has changed further comprises:

when the switchover indication information comprises the first indicator, determining, by the MN, that the accessed IP subnet has changed; or when the switchover indication information comprises the second indicator, determining, by the MN, that the accessed IP subnet has not changed.

5. The method according to claim 4, wherein the method further comprises:

receiving, by the MN, a router advertisement message sent by the IP address anchor, wherein the router advertisement message comprises an IP address prefix allocated by the IP address anchor, an IP address prefix allocated by another IP address anchor, and a type identifier, wherein the type identifier is used to identify the IP address prefix allocated by the IP address anchor and the IP address prefix allocated by the another IP address anchor.

6. The method according to claim 3, wherein the type identifier comprises a first type identifier and/or a second type identifier;

the first type identifier is correspondingly set for the IP address prefix allocated by the IP address anchor; and the second type identifier is correspondingly set for the IP address prefix allocated by the another IP address anchor.

7. The method according to claim 3, wherein the method further comprises:

differentiating, by the MN according to the type identifier, between the IP address prefix allocated by the IP address anchor and the IP address prefix allocated by the another IP address anchor.

8. The method according to claim 3, wherein the method further comprises:

when the MN determines that the accessed IP subnet has changed, querying for and obtaining, by the MN, an IP address of a correspondent node CN that is closest to the MN; and establishing, by the MN, a network session with the closest CN according to the IP address.

9. An IP address management apparatus, comprising:

a processor; and a non-transitory computer readable storage medium storing a program for execution by the processor, the program comprising instructions to configure the processor for:

obtaining a valid IP address prefix being used by a mobile node (MN) when detecting that the MN accesses an IP subnet on which an IP address anchor is located; and sending switchover indication information to the MN according to the valid IP address prefix, using an information sending module of the IP address anchor, the switchover indication information is for determining whether the accessed IP subnet has changed, wherein the sending the switchover indication information to the MN according to the valid IP address prefix comprises:

determining whether the valid IP address prefix already comprises an IP address prefix allocated by the IP address anchor;

if the valid IP address prefix does not comprise an IP address prefix allocated by the IP address anchor, allocating an IP address prefix to the MN, and identifying the IP address prefix allocated by the IP address anchor and an IP address prefix that is in the valid IP address prefix and that is allocated by another IP address anchor; or if the valid IP address prefix already comprises an IP address prefix allocated by the IP address anchor, identifying the IP address prefix allocated by the IP address anchor and an IP address prefix that is in the valid IP address prefix and that is allocated by another IP address anchor; and sending the switchover indication information to the MN, wherein the switchover indication information comprises the IP address prefix allocated by the IP address anchor, the IP address prefix allocated by the another IP address anchor, and a type identifier, wherein the type identifier is used to identify the IP address prefix allocated by the IP address anchor and the IP address prefix allocated by the another IP address anchor.

10. The IP address management apparatus according to claim 9, wherein the sending the switchover indication information to the MN according to the valid IP address prefix further comprises:

determining, according to the valid IP address prefix, whether the IP subnet accessed by the MN has changed; and sending the switchover indication information to the MN according to a determining result, wherein the switchover indication information comprises a first indicator or a second indicator, wherein the first indicator is used to indicate that the IP subnet accessed by the MN has changed, and the second indicator is used to indicate that the IP subnet accessed by the MN has not changed.

11. A mobile node (MN), wherein the MN comprises a processor, a memory, and a transceiver, wherein the memory is configured to store one or more instructions, and the instruction is configured to be executed by the processor;

the processor is configured to: after an IP subnet on which an IP address anchor is located is accessed, control the transceiver to receive switchover indication information sent by the IP address anchor using an information sending module of the IP address anchor; and the processor is further configured to determine, according to the switchover indication information, whether the accessed IP subnet has changed, wherein the switchover indication information comprises an IP address prefix allocated by the IP address anchor, and IP address prefix allocated by another IP address anchor, and a type identifier, wherein the type identifier is used to identify the IP address prefix allocated by the IP address anchor and the IP address prefix allocated by the another IP address anchor; and the processor is configured to:

determine whether the IP address prefix allocated by the IP address anchor meets a preset condition, wherein the preset condition is: the IP address prefix allocated by the IP address anchor does not exist in previous switchover indication information received by the MN, or the IP address prefix allocated by the IP address anchor exists in previous switchover indication information received by the MN and is identified as being allocated by the another IP address anchor;

if the IP address prefix allocated by the IP address anchor meets the preset condition, determine that the accessed IP subnet has changed; or if the IP address prefix allocated by the IP address anchor does not meet the preset condition, determine that the accessed IP subnet has not changed.

12. The MN according to claim 11, wherein the switchover indication information comprises a first indicator or a second indicator, wherein the first indicator is used to indicate that the IP subnet accessed by the MN has changed, and the second indicator is used to indicate that the IP subnet accessed by the MN has not changed; and the processor is further configured to:

when the switchover indication information comprises the first indicator, determine that the accessed IP subnet has changed; or when the switchover indication information comprises the second indicator, determine that the accessed IP subnet has not changed.

13. The MN according to claim 12, wherein the processor is further configured to control the transceiver to receive a router advertisement message sent by the IP address anchor, wherein the router advertisement message comprises an IP address prefix allocated by the IP address anchor, an IP address prefix allocated by another IP address anchor, and a type identifier, wherein the type identifier is used to identify the IP address prefix allocated by the IP address anchor and the IP address prefix allocated by the another IP address anchor.

14. The MN according to claim 11, wherein the type identifier comprises a first type identifier and/or a second type identifier;

the first type identifier is correspondingly set for the IP address prefix allocated by the IP address anchor; and the second type identifier is correspondingly set for the IP address prefix allocated by the another IP address anchor.

15. The MN according to claim 11, wherein the processor is further configured to differentiate, according to the type identifier, between the IP address prefix allocated by the IP address anchor and the IP address prefix allocated by the another IP address anchor.

16. The MN according to claim 11, wherein the processor is further configured to: when the MN determines that the accessed IP subnet has changed, query for and obtain an IP address of a correspondent node CN that is closest to the MN; and the processor is further configured to establish a network session with the closest CN according to the IP address.

* * * * *

UNITED STATES PATENT AND TRADEMARK OFFICE
CERTIFICATE OF CORRECTION

PATENT NO. : 10,728,828 B2  
APPLICATION NO. : 15/870171  
DATED : July 28, 2020  
INVENTOR(S) : Xinpeng Wei Page 1 of 1

It is certified that error appears in the above-identified patent and that said Letters Patent is hereby corrected as shown below:

In the Claims

In Claim 3, Column 41, Line 33, "and IP" should be --an IP--.

In Claim 11, Column 43, Line 40, "and IP" should be --an IP--.

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*